US011854367B1

(12) United States Patent
Ulen

(10) Patent No.: US 11,854,367 B1
(45) Date of Patent: Dec. 26, 2023

(54) DETECTING EVENTS BASED ON THE RHYTHM AND FLOW OF A PROPERTY

(71) Applicant: Alarm.com Incorporated, Tysons, VA (US)

(72) Inventor: Colin Ulen, Cambridge, MA (US)

(73) Assignee: Alarm.com Incorporated, Tysons, VA (US)

( * ) Notice: Subject to any disclaimer, the term of this patent is extended or adjusted under 35 U.S.C. 154(b) by 225 days.

(21) Appl. No.: 17/000,040

(22) Filed: Aug. 21, 2020

Related U.S. Application Data

(63) Continuation-in-part of application No. 16/149,118, filed on Oct. 1, 2018, now Pat. No. 11,043,090.

(60) Provisional application No. 62/566,289, filed on Sep. 29, 2017.

(51) Int. Cl.
G08B 21/18 (2006.01)
G06N 5/02 (2023.01)
G06N 5/04 (2023.01)
G06N 20/00 (2019.01)

(52) U.S. Cl.
CPC .............. *G08B 21/18* (2013.01); *G06N 5/02* (2013.01); *G06N 5/04* (2013.01); *G06N 20/00* (2019.01)

(58) Field of Classification Search
CPC ..... G08B 13/1672; G10L 25/51; H04R 1/406; H04R 3/005; H04R 2201/405
See application file for complete search history.

(56) References Cited

U.S. PATENT DOCUMENTS

| 6,211,787 B1 | 4/2001 | Yoshiike et al. |
| 6,796,799 B1 | 9/2004 | Yoshiike et al. |
| 6,989,746 B2 * | 1/2006 | Rasmussen ............ G08B 13/04 |
| | | 340/541 |
| 7,002,463 B2 | 2/2006 | Wakabayashi |
| 7,091,865 B2 | 8/2006 | Cuddihy et al. |
| 7,187,279 B2 | 3/2007 | Chung |
| 7,552,030 B2 | 6/2009 | Guralnik et al. |
| 7,612,666 B2 | 11/2009 | Badawy |
| 8,237,571 B2 | 8/2012 | Wang et al. |
| 8,525,687 B2 | 9/2013 | Tran |
| 8,810,408 B2 | 8/2014 | Hanson et al. |
| 9,609,003 B1 | 3/2017 | Chmielewski et al. |
| 10,068,445 B2 | 9/2018 | Nongpiur et al. |

(Continued)

FOREIGN PATENT DOCUMENTS

CN 109555977 A * 4/2019

*Primary Examiner* — Kam Wan Ma
(74) *Attorney, Agent, or Firm* — Fish & Richardson P.C.

(57) ABSTRACT

Methods, systems, and apparatus, including computer programs encoded on a storage device, for a monitoring system that is configured to monitor a property. The monitoring system may include a sensor that is configured to generate sensor data that reflects an attribute of the property, a microphone that is connected to a pipe and that is configured to detect audio data associated with the pipe, and a monitor control unit. The monitor control unit is configured to receive the sensor data and the audio data, provide the sensor data and the audio data as inputs to a model that is trained to determine that a device connected to the pipe is being used, receive, from the model, data indicating that the device connected to the pipe is being used, and based on determining that the device connected to the pipe is being used, perform a monitoring system action.

18 Claims, 7 Drawing Sheets

(56) References Cited

U.S. PATENT DOCUMENTS

| | | | |
|---|---|---|---|
| 10,153,966 B1 | 12/2018 | Trundle | |
| 10,249,293 B1 * | 4/2019 | Mossoba | G10L 15/063 |
| 10,311,694 B2 * | 6/2019 | McIntosh | G06N 5/045 |
| 2003/0052789 A1 | 3/2003 | Colmenarez et al. | |
| 2003/0117279 A1 | 6/2003 | Ueno et al. | |
| 2003/0229471 A1 * | 12/2003 | Guralnik | G06N 5/00 |
| | | | 702/182 |
| 2004/0145471 A1 | 7/2004 | Lawrenson et al. | |
| 2009/0082699 A1 | 3/2009 | Bang et al. | |
| 2009/0089089 A1 | 4/2009 | Jang et al. | |
| 2010/0127878 A1 | 5/2010 | Wang et al. | |
| 2011/0037605 A1 | 2/2011 | Robison, Jr. et al. | |
| 2015/0046131 A1 * | 2/2015 | Fei | G06F 30/20 |
| | | | 703/2 |
| 2015/0142695 A1 * | 5/2015 | He | G06N 20/00 |
| | | | 705/348 |
| 2016/0379456 A1 * | 12/2016 | Nongpiur | G08B 13/1672 |
| | | | 340/541 |
| 2017/0064412 A1 | 3/2017 | Taxier | |
| 2018/0061189 A1 | 3/2018 | Anand et al. | |
| 2018/0286279 A1 | 10/2018 | Alcaide Dias et al. | |
| 2019/0059725 A1 * | 2/2019 | Greiner | G16H 50/20 |

\* cited by examiner

DETECTING EVENTS BASED ON THE
RHYTHM AND FLOW OF A PROPERTY

CROSS-REFERENCE TO RELATED APPLICATIONS

This application is a continuation-in-part of U.S. application Ser. No. 16/149,118, filed Oct. 1, 2018, which claims the benefit of U.S. Application No. 62/566,289, filed Sep. 29, 2017, both of which are incorporated by reference.

BACKGROUND

In a typical property monitoring system, one or more sensors may be installed at the property. A sensor may detect the occurrence of an activity such as movement, glass-break, door-opening, temperature change, presence of gas, or the like. The sensor may generate and broadcast sensor data indicative of the detection of the activity. A monitoring unit such as a monitoring system control unit or a cloud-based monitoring application server may detect the sensor data, analyze the sensor data, and determine whether to perform one or more operations based on the detected sensor data.

Such sensor data is typically evaluated in isolation. For example, a contact sensor is configured to generate sensor data when a monitoring system is armed and a door or window opens. A monitoring unit can detect the opening of the door or window based on the generated sensor data and perform one or more operations (e.g., trigger an alarm, notify law enforcement, notify a legitimate occupant of the property, or the like). By way of another example, a motion sensor may be configured to generate sensor data in response to the detection of an object moving. In such instances, a monitoring unit can detect the motion based on the generated sensor data and perform one or more operations. By way of another example, a glass-break sensor may generate sensor data in response to the detection of glass breaking. In such instances, a monitoring unit can detect the breaking of the glass window based on the generated sensor data and perform one or more operations.

SUMMARY

According to one innovative aspect of the present disclosure, a system for detecting events based on the rhythm and flow of a property is disclosed. The system may be configured to monitor a property and include a sensor that is configured to generate sensor data that reflects an attribute of the property, a microphone that is connected to a pipe and that is configured to detect audio data associated with the pipe, and a monitor control unit. The monitor control unit may be configured to receive the sensor data and the audio data, provide the sensor data and the audio data as inputs to a model that is trained to determine that a device connected to the pipe is being used, receive, from the model, data indicating that the device connected to the pipe is being used, and based on determining that the device connected to the pipe is being used, perform a monitoring system action.

Other aspects include corresponding methods, apparatus, and computer programs to perform actions of methods defined by instructions encoded on computer storage devices.

These and other versions may optionally include one or more of the following features as described in more detail by the specification and drawings.

DETAILED DESCRIPTION

The present disclosure is directed to detecting events based on the rhythm and flow of a property. The rhythm and flow of the property may be described as a group of related activities that occur at the property. A group of related activities may include, for example, a plurality of activities that occur within a predetermined amount of time, a plurality of activities that occur within a predetermined amount of time in a particular portion of the property, or the like. The activities may include, for example, movement of one or more objects at a property, movement of one or more objects in a particular portion of the property, or the like. An object may include, for example, a person, an animal, a device, or the like. Alternatively, or in addition, the activities may include energy usage by one or more devices at a property, energy usage by one or more devices in a particular portion of the property, or the like. Alternatively, or in addition, the activities may include one or more sounds being produced at the property, one or more sounds produced in a particular portion of the property, or the like. Sounds at the property may be produced one or more objects.

A monitoring unit such as a monitoring system control unit, a monitoring application server, or the like, can detect the occurrence of each respective activity that occurs at a property and store activity data representing (i) the respective activity and (ii) the time the respective activity occurred. The monitoring unit can analyze the stored activity data to identify patterns of related activities. The monitoring unit can infer the likely occurrence of an event based on the identified pattern of activities. Activities may be related if, for example, the activities occur within a predetermined amount of time of each other, in the same portion of the property as each other, or a combination thereof. By identifying activity patterns, the monitoring unit can detect expected events, unexpected events, or both, that would otherwise not be able to be detected without one or more additional sensors.

An expected event may include, for example, an event that is identified based on the occurrence of each activity in a set of activities that are determined to be indicative of the occurrence of a particular event. In some implementations, an unexpected event may include, for example, an event that is identified based on the occurrence of less than all of the activities in a set of activities that are determined to be indicative of the occurrence of a particular event. Alternatively, in other implementations, an unexpected event may occur when more than all of the activities in a set of activities occur within a predetermined time period.

Figure 1:
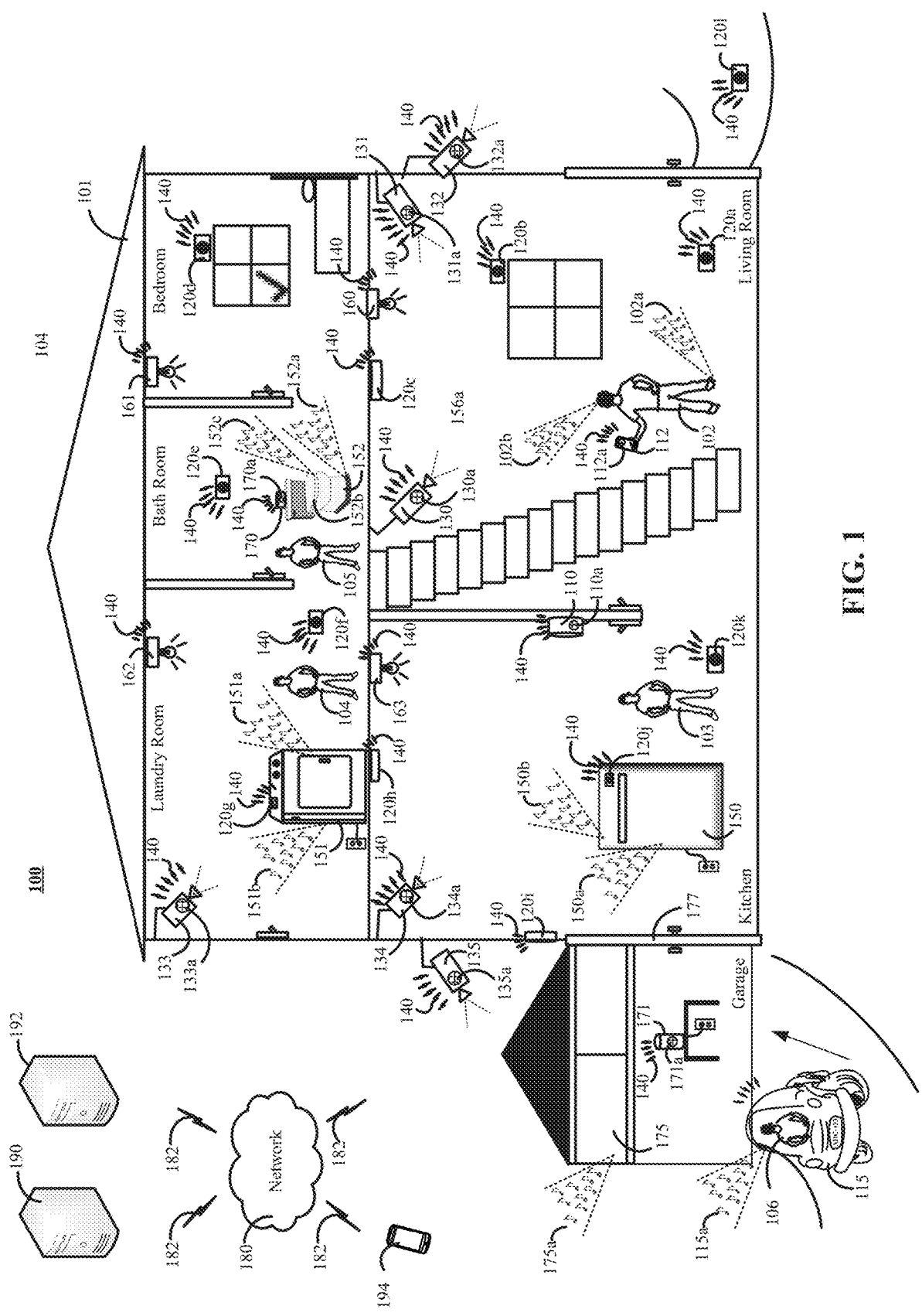
FIG. 1 is a contextual diagram of an example of a monitoring system that can detect an event based on the rhythm and flow of a property.

FIG. 1 is a contextual diagram of an example of a monitoring system 100 that can detect an event based on the rhythm and flow of a property 101.

The monitoring system 100 includes a monitoring system control unit 110, one or more sensors 120a, 120b, 120c, 120d, 120e, 120f, 120g, 120h, 120i, 120j, 120k, 120l, one or more cameras 130, 131, 132, 133, 134, 135, a local network 140, one or more connected light bulbs 160, 161, 162, 163, one or more home assistants 170, 171, a remote network 180, a monitoring application server 190, and a central alarm station server 192, or a combination thereof.

The monitoring system 100 (or monitoring application server 190) can collect activity data related to activities that occur in the property 101. Activity data may include sensor data, image data, audio data, or a combination thereof. The monitoring system 100 can collect sensor data generated by the one or more sensors 120a, 120b, 120c, 120d, 120e, 120f, 120g, 120h, 120i, 120j, 120k, 120l, image data (e.g., still images, video images, or a combination thereof) captured by the one or more cameras 130, 131, 132, 133, 134, 135, audio data (e.g., recordings of sounds) captured by one or more listening devices (e.g., a microphone), or a combination thereof.

For example, the monitoring system control unit 110 (or monitoring application server 190) can detect the sensor data generated and broadcast by a motion sensor 120f that is indicative of an activity such as movement, associate a time stamp with the broadcasted sensor data, and store an activity data record that includes the broadcasted sensor data and timestamp. In such implementations, the monitoring system control unit 110 may perform each of the aforementioned stages locally. The monitoring system control unit 110 may perform the same operations for image data that is captured and broadcasted by one or more cameras 130, 131, 132, 133, 134, 135 and audio data that is captured and broadcasted by one or more listening devices (e.g., a microphone).

Alternatively, in some implementations, a sensor may timestamp sensor data at the time of generation of the sensor data in order to associate the most accurate time of occurrence with the sensor data as possible. In such instances, the timestamped sensor data may be broadcasted to the monitoring system control unit 110 for storage and analysis.

By way of another example, the one or more cameras 130, 131, 132, 133, 134, 135 can be used to capture images of an activity. For example, a camera 130, 131, 132, 133, 134, 135 can determine that an object such as person, animal, or device is present in a particular portion of the property 101. Such image data may be used in place of, or in addition to, motion sensor data to determine that an object such as a person is present in a room, near a device, or the like before, or after, the occurrence of one or more other activities. For example, a camera 133 can capture an image of a person 104 and determine, based on a time stamp associated with the captured image, that a person 104 was present in the Laundry Room before the dryer 151 door was closed and the dryer started using power based on the timestamp of the captured image relative to respective timestamps associated with the audio recording of a dryer door closing and the sensor data from an energy sensor indicating that the dryer has started using power.

In some implementations, image data captured by a camera such as camera 130 may be captured and broadcasted by the camera, and then the monitoring system control unit 110 can detect the broadcasted image data, associate a timestamp with the image data, and store an activity data record based on the broadcasted audio data and the timestamp. Alternatively, a camera may timestamp image data at the time of generation of the image data in order to associate the most accurate time of occurrence with the sensor data as possible. In such instances, the timestamped image data may be broadcasted to the monitoring system control unit 110 for storage and analysis.

The one or more listening devices of monitoring system 100 may come in a variety of different forms. For example, a listening device may include a microphone 110a that is included in the monitoring system control unit 110. Alternatively, or in addition, a listening device may include a microphone 130a, 131a, 132a, 133a, 134a, 135a that are found in each respective camera 130, 131, 132, 133, 134, 135. Alternatively, or in addition, a listening device may include one or more microphones 170a, 171a that are each in a respective home assistant 170, 171. Alternatively, or in addition, a listening device may include a microphone 112a that is in a smartphone 112 (or other user device). Other types of microphones may also be used as listening devices. For example, a listening device may include a microphone included in other types of electronic devices in the property 101 such as smartwatch microphones, tablet computer microphones, laptop computer microphones, desktop computer microphones, or the like.

Each listening device is configured to detect and capture data related to audio activities that occur at a property 101 such as audio generated by footsteps, voices, animals, doors opening, doors closing, devices operating, or the like. One or more listening devices may detect the audio activity and broadcast data representative of the audio activity. For example, the listening device can be configured to capture a recording of audio activity and broadcast the recording of the audio activity. The monitoring system control unit 110 (or monitoring application server 190) can detect the broadcasted audio data and associate a time stamp with the broadcasted audio data. The broadcasted audio data and timestamp may be stored by one or more of the monitoring control unit 110 (or monitoring application server 190) for analysis.

In some implementations, audio data captured by a listening device such as a microphone 131a of a camera 131 may be captured and broadcasted by the camera 131, and then the monitoring system control unit 110 can detect the broadcasted audio data, associate a timestamp with the audio data, and store an activity data record based on the broadcasted audio data and the timestamp. For example, the camera 131 can capture the sound 102a of each respective footstep of the person 103 walking in the Living Room, broadcast the audio data (e.g., a recording of the sound of the footstep, a representation of the sound of each footstep (e.g., an audio fingerprint), or both. The monitoring system control unit 110 can detect the broadcasted audio data of each footstep, associate a timestamp with each broadcasted audio data of each footstep, and store and analyze the timestamped audio data of each footstep as activity data. Alternatively, a camera 131 may timestamp audio data produced by each footprint at the time of capturing the audio data in order to associate the most accurate time of occurrence with the audio data as possible. In such instances, the timestamped audio data may be broadcasted to the monitoring system control unit 110 for storage and analysis.

In some implementations, the monitoring application server 190 can be used to remotely store and analyze activity data associated with a property such as sensor data, image data, and audio data. In such instances, the activity data associated with the property may be provided to the monitoring application server 190 in a variety of different ways. For example, the monitoring system control unit 110 may (i) detect activity data (e.g., sensor data, image data, or audio data), (ii) associate the detected activity data (e.g., sensor data, image data, or audio data) with a timestamp, and (iii) transmit the timestamped activity data (e.g., sensor data, image data, or audio data) to the monitoring application server 190 for storage and analysis. In other implementations, the particular component of the monitoring system 100 that generated the respective activity data (e.g., sensor data, image data, or audio data) such as a sensor, camera, or listening device, respectively, may (i) detect the activity data (e.g., sensor data, image data, or audio data), (ii) associate a timestamp with the detected activity data (e.g., sensor data, image data, or audio data) and (iii) transmit a message to the monitoring application server 190 that includes the activity data (e.g., the sensor data, the image data, or the audio activity) and the timestamp without using the monitoring system control unit 110 as an intermediary.

The monitoring system control unit 110 (or monitoring application server 190) is configured to learn that two or more activities detected at the property 101 indicate the likely occurrence of an event. Learning that the two or more activities detected at the property 101 indicate the likely occurrence of an event may include, for example, analyzing activity data stored by the monitoring system control unit 110 (or monitoring application server 190) to identify patterns in the activity data. Two or more activities may be related if, for example, the two or more activities occur within a predetermined amount of time, the two or more activities occur within a predetermined amount of time in a particular portion of the property, or the like. The monitoring system 100 may infer that a particular event occurred based on a series of activities detected by the monitoring system 100.

By way of example, with reference to FIG. 1, the Kitchen may include a dishwasher 150, an energy sensor 120*j*, a motion sensor 120*k*, and one or more listening devices such as microphones 110*a* and 134*a*. Typical operation of a dishwasher 150 may begin with a person 103 loading the dishwasher 150. The motion sensor 120*k* will detect the person's 103 motion activity near the dishwasher 150 and generate sensor data (S1) indicative of movement. The monitoring system control unit 110 can detect this sensor data (S1), associate the detected sensor data (S1) with a timestamp (T1), a room location (Kitchen), or both, and provide the sensor data (S1) and timestamp (T1) to the monitoring application server 190 for storage and analysis. The room location in this example (and other examples described herein) may be determined by the monitoring system control unit 110 based on (i) the sensor identifier of the sensor (e.g., motion sensor) that generated the sensor data, (ii) the communication channel used by the sensor to communicate with the monitoring system control unit 110, or both.

The person 103 may close the dishwasher 150 door which creates a sound 150*a*. A listening device such as the monitoring system control unit 110 microphone 110*a* may (i) capture audio data (A1) (e.g., a sound recording) of the sound 150*a*, (ii) associate the captured audio (A1) with a timestamp (T2), a property location (Kitchen), or both, and (iii) transmitted the captured audio data (A1) and timestamp (T2) to the monitoring application server 190 for storage and analysis.

The dishwasher 150 may begin to run which includes the dishwasher 150 drawing power and then the dishwasher 150 producing noise 150*b* when running. The energy sensor 120*j* can generate and broadcast sensor data (S2) indicative of energy use by the dishwasher 150. The broadcasted sensor data (S2) may be (i) detected by the monitoring system control unit 110, (ii) associated with a time stamp (T3), a property location (e.g., Kitchen), or both, and (iii) transmitted to the monitoring application server 190 for storage and analysis. A listening device such as the monitoring system control unit 110 microphone 110*a* may also (i) capture audio data (e.g., a sound recording) (A2) of the sound 150*b*, (ii) associate the captured audio (A2) with a time stamp (T4), a room location (Kitchen), or both, and (iii) transmit the captured audio data (A2) and timestamp (T4) to the monitoring application server 190 for storage and analysis.

The monitoring application server 190 may analyze the stored activity data to identify patterns in the activity data indicative of an event. For example, the monitoring application server 190 can detect that a pattern of activities such as S1-A1-S2-A2 occurs within a time period between T1 and T4 that it is likely that the dishwasher is running. The monitoring application server 190 can make this determination because it knows, based on the activity data S1-A1-S2-A2 that a person was moving in the vicinity of the dish washer, the dish washer door was closed, the dish washer started using power, and the dish washer started making noises indicative of operation (e.g., sound of motor running, sound of water running, sound of water spraying, a combination thereof, or the like). In some implementations, upon an initial identification of the pattern S1-A1-S2-A2, the monitoring application server 190 (or monitoring system control unit 110) can transmit a notification to a user device 112 that prompts a user to confirm that S1-A1-S2-A2 is indicative of dishwasher running. Alternatively, the monitoring application server 190 can detect the activity pattern S1-A1-S2-A2 and ask the user what the activity pattern is. The monitoring application server 190 can then learn that a potential event has occurred in the property 101 based on the activity pattern S1-A1-S2-A2 and the user's feedback.

Once the monitoring application server 190 learns an activity pattern associated with an event, the event becomes known to the monitoring system 100 as an expected event. The monitoring application server 190 can later identify expected events based on a received set of activity data that includes sensor data, image data, audio data, or a combination thereof. For example, the monitoring application server 190 can monitor sets of activity data (e.g., sensor data, image data, audio data, or a combination thereof) received in real-time (or near real-time) from one or more monitoring system 100 components installed at the property 101 for the occurrence of an expected event. For example, with reference to the example of FIG. 1 described above, if at a point in the future the monitoring application server 190 detects the occurrence of the activity pattern S1-A1-S2-A2, then the monitoring unit can determine that the dishwasher 150 is running.

In some implementations, the monitoring application server 190 can provide updates of expected events that have been learned by the monitoring system 100 to a monitoring system control unit 110. In such instances, the monitoring system control unit 110 can monitor sets of activity data detected, captured, or both, in real-time (or near real-time) for the occurrence of one or more activity patterns corresponding to an expected event in the same manner as the monitoring application server 190. A local repository of activity patterns for expected events may be stored by the monitoring system control unit 110 and updated by the monitoring application server 190 periodically. Alternatively, the local repository of activity patterns for expected events may be updated asynchronously as activity patterns for new expected events are detected.

The monitoring system control unit 110 or monitoring application server 190 may perform, or initiate, one or more operations based on the detection of an activity pattern associated with an expected event. For example, the monitoring unit may detect the activity pattern S1-A1-S2-A2 and that the person is leaving the property 101 (e.g., because the user has armed the monitoring system, because the user is opening the garage door, or the like). In response to determining that the dish washer is running and that the person is likely leaving the property 101, the monitoring unit can transmit a notification to the person's device (e.g., mobile device 112) asking the person whether the person wants to leave the dish washer running while the person is away from the property 101. Examples of other types of operations that can be performed, or initiated, by the monitoring system control unit 110 or monitoring application server 190 will be described below with reference to particular examples of FIG. 1.

In some implementations, the monitoring unit can detect incomplete activity patterns. In such instances, the monitoring system control unit 110 or monitoring application server 190 can prompt a person 102 as to whether the detected incomplete activity should be completed. For example, the a monitoring unit can detect the activity pattern S1-A1, which is indicative of the user moving near the dish washer (S1) and closing the dish washer door (A1). In such instances, the monitoring system may transmit a notification the person's 102 device 112 asking the person 102 whether the person 102 intended to start the dish washer 150. Additional examples of incomplete activities will be described below with reference to FIG. 2.

With reference to the Laundry Room of FIG. 1, another example of learning and detecting an event is provided. For example, with reference to FIG. 1, the Laundry Room may include a dryer 151, an energy sensor 120g, a motion sensor 120f, and one or more listening devices such as camera 133 microphone 133a. Typical operation of a dryer 151 may begin with a person 104 putting clothes into the dryer 151. The motion sensor 120k will detect the person's 104 motion activity near the dyer 151 and generate sensor data (S3) indicative of movement. The monitoring system control unit 110 can detect this sensor data (S3), associate the detected sensor data (S3) with a timestamp (T5), a property location (e.g., Laundry Room), or both, and provide the sensor data (S3) and timestamp (T5) to the monitoring application server 190 for storage and analysis.

The person 104 may close the dryer 151 door which creates a sound 151a. A listening device such as the camera 133 microphone 133a may (i) capture audio data (A3) (e.g., a sound recording) of the sound 151a, (ii) associate the captured audio (A3) with a timestamp (T6), and broadcast the captured audio data (A3) and timestamp (T6) via the network 140. The monitoring system control unit 110 may detect the broadcasted audio data (A3), and associate one or more pieces of information with the detected audio data (A3). If the audio data (A3) is not already associated with timestamp, the monitoring system control unit 110 may associate the audio data (A3) with a timestamp. Alternatively, or in addition, the monitoring system control unit 110 may associate the audio data (A3) with a property location (e.g., Laundry Room). The monitoring system control unit 110 can transmit the captured audio data (A3) and timestamp (T6) to the monitoring application server 190 for storage and analysis.

The dryer 151 may begin to run which includes the dryer 151 drawing power and then the dryer 151 producing noise 151b when running. The energy sensor 120g can generate and broadcast sensor data (S4) indicative of energy use by the dryer 151. The broadcasted sensor data (S4) may be (i) detected by the monitoring system control unit 110, (ii) associated with a time stamp (T7), a property location (e.g., Laundry Room), or both, and (iii) transmitted to the monitoring application server 190 for storage and analysis.

A listening device such as the camera 133 microphone 133a may also (i) capture audio data (e.g., a sound recording) (A4) of the sound 151b, (ii) associate the captured audio (A4) with a time stamp (T8), a room location (e.g., Laundry Room), or both, and (iii) broadcast the captured audio data (A4) and timestamp (T8) via the network 140. The monitoring system control unit 110 may detect the broadcasted audio data (A4), and associate one or more pieces of information with the detected audio data (A4). If the audio data (A4) is not already associated with timestamp, the monitoring system control unit 110 may associate the audio data (A4) with a timestamp. Alternatively, or in addition, the monitoring system control unit 110 may associate the audio data (A4) with a property location (e.g., Laundry Room). The monitoring system control unit 110 can transmit the captured audio data (A4) and timestamp (T8) to the monitoring application server 190 for storage and analysis.

The monitoring application server 190 may analyze the stored activity data to identify patterns in the activity data indicative of an event. For example, the monitoring application server 190 can detect that a pattern of activities such as S3-A3-S4-A4 occurs within a time period between T5 and T8 that it is likely that the dryer 151 is being used to dry clothes. The monitoring application server 190 can make the determination because it knows, based on the activity data S3-A3-S4-A4 that a person 104 was moving in the vicinity of the dryer 151, the dryer 151 door was closed, the dryer 151 started using power, and the dryer 151 started making noises indicative of operation (e.g., sound of motor running, sound of water running, sound of water spraying, a combination thereof, or the like). In some implementations, upon an initial identification of the pattern S3-A3-S4-A4, the monitoring application server 190 can transmit a notification to a user device 112 that prompts a user to confirm that S3-A3-S4-A4 is indicative of dryer running. Alternatively, the monitoring application server 190 can detect the activity pattern S3-A3-S4-A4 and ask the user what the activity pattern is. The monitoring application server 190 can then learn that a potential event has occurred in the property 101 based on the activity pattern S3-A3-S4-A4 and the user's feedback. In some implementations, the monitoring application server 190 can update a local repository of activity patterns for expected events stored on a monitoring system control unit 110 based on the learning of a new activity pattern that corresponds to an expected event.

In addition, in some implementations, a newly learned activity pattern may be used to update a global repository stored by a monitoring application server 190. Alternatively, or in addition, a learned activity pattern may be propagated to a local repository of activity patterns for expected events stored by one or more other monitoring system control units at other respective properties. For example, a monitoring application server 190 can determine that a first property and a second property include the same model dryer. In such instances, the monitoring application server 190 can update a local repository of activity patterns for expected events stored by the monitoring system control unit of the second property to include an activity pattern for an expected event of the dryer running that was learned at the first property. In such instances, the monitoring application server 190 may need to determine that the second property has each of the necessary sensors, detectors, listening devices, cameras, or the like installed in the same, or sufficiently similar configuration (e.g., same set of sensors, detectors, listening devices, cameras in a different location within the same room or different set of sensors, detectors, listening devices, cameras capable of collecting the same activity data), as the first property in order to perform the propagation of the activity pattern.

The monitoring system control unit 110 (or monitoring application server 190) may perform, or initiate, one or more operations based on the detection of an activity pattern associated with an expected event. For example, the monitoring unit may detect the activity pattern S3-A3-S4-A4 indicative of the expected event of a dryer running and transmits a notification to the user device 112 of a legitimate occupant 102 of the property 101 that prompts the legitimate occupant 102 of the property 101 as to whether the legitimate occupant 102 of the property 101 emptied the lint trap of the dryer before activating the dryer 151. If the legitimate occupant 102 of the property 101 forgot to empty the lint trap, the notification can remind the legitimate occupant 102 to return to the dryer 151 and empty the lint trap. In this manner, the monitoring system 100 can help to eliminate a potential fire hazard (i.e., a full lint trap). Examples of other types of operations that can be performed, or initiated, by the monitoring system control unit 110 or monitoring application server 190 will be described below with reference to particular examples of FIG. 1.

The monitoring system 100 is not limited to learning activity patterns that alternate between sensor data and audio data (e.g., a pattern of S\*-A\*-S\*-A\*). By way of example, with reference to the Bath Room of FIG. 1, the Bath Room may include a toilet 152, a motion sensor 120*e*, and one or more listening devices such as home assistant 170 microphone 170*a*. A person 105 may enter the Bath Room to use the toilet 152. The motion sensor 120*e* will detect the person's 105 motion activity near the toilet 152 and generate sensor data (S5) indicative of movement. The monitoring system control unit 110 can detect this sensor data (S5), associate the detected sensor data (S5) with a timestamp (T9), a property location (e.g., Bath Room), or both, and provide the sensor data (S5) and timestamp (T9) to the monitoring application server 190 for storage and analysis.

After using the toilet 152, the person 105 may flush the toilet creating a sound 152*a* and put down the toilet seat 152*b* creating a sound 152*c*. A listening device such as the home assistant 170 microphone 170*a* may (i) capture audio data (A5) (e.g., a sound recording) of the sound 152*a*, (ii) associate the captured audio (A5) with a timestamp (T10), and broadcast the captured audio data (A5) and timestamp (T10) via the network 140. The monitoring system control unit 110 may detect the broadcasted audio data (A5), and associate one or more pieces of information with the detected audio data (A5). If the audio data (A5) is not already associated with timestamp, the monitoring system control unit 110 may associate the audio data (A5) with a timestamp. Alternatively, or in addition, the monitoring system control unit 110 may associate the audio data (A5) with a property location (e.g., Bath Room). The monitoring system control unit 110 can transmit the captured audio data (A5) and timestamp (T10) to the monitoring application server 190 for storage and analysis.

In a similar manner, the home assistant 170 microphone 170*a* may (i) capture audio data (e.g., a sound recording) (A6) of the sound 152*c*, (ii) associate the captured audio (A6) with a timestamp (T11), and broadcast the captured audio data (A6) and timestamp (T11) via the network 140. The monitoring system control unit 110 may detect the broadcasted audio data (A6), and associate one or more pieces of information with the detected audio data (A6). If the audio data (A6) is not already associated with timestamp, the monitoring system control unit 110 may associate the audio data (A6) with a timestamp. Alternatively, or in addition, the monitoring system control unit 110 may associate the audio data (A6) with a property location (e.g., Bath Room). The monitoring system control unit 110 can transmit the captured audio data (A6) and timestamp (T11) to the monitoring application server 190 for storage and analysis. In this example, the monitoring application server 190 can learn that the series of activities S5-A5-A6 within a period of time T9 to T11 is indicative of a person 105 using the toilet 152. This activity pattern of S5-A5-A6 is different the activity patterns described with respect to the dishwasher 160 and dryer 151. The monitoring application server 190 can update a local repository of activity patterns for expected events stored on a monitoring system control unit 110 based on the learning of a new activity pattern that corresponds to an expected event. Such an activity pattern may be used, as described with reference to FIG. 2 below, to detect leaks at a property 101.

The monitoring system 100 is not limited to learning activity patterns that only consist of sensor data and audio data. For example, an activity data may also include image data. By way of example, with reference to the Garage of FIG. 1, the Garage may include a listening device such as a home assistant 171 microphone 171*a*, a garage door 175, and one or more cameras 135. A person 106 may arrive home driving his/her vehicle 115, instruct the garage door 175 to open, and drive the vehicle 115 into the Garage. Opening the garage door 175 creates a sound 175*a*. A listening device such as the home assistant 171 microphone 171*a* may (i) capture audio data (A7) (e.g., a sound recording) of the sound 175*a*, (ii) associate the captured audio (A7) with a timestamp (T12), and broadcast the captured audio data (A7) and timestamp (T12) via the network 140. The monitoring system control unit 110 may detect the broadcasted audio data (A7), and associate one or more pieces of information with the detected audio data (A7). If the audio data (A7) is not already associated with a timestamp, the monitoring system control unit 110 may associate the audio data (A7) with a timestamp. Alternatively, or in addition, the monitoring system control unit 110 may associate the audio data (A7) with a property location (e.g., Garage). The monitoring system control unit 110 can transmit the captured audio data (A7) and timestamp (T12) to the monitoring application server 190 for storage and analysis.

In a similar manner, the home assistant 170 microphone 170*a* may (i) capture audio data (e.g., a sound recording) (A8) of the sound 115*a*, (ii) associate the captured audio (A8) with a timestamp (T13), and broadcast the captured audio data (A8) and timestamp (T13) via the network 140. The monitoring system control unit 110 may detect the broadcasted audio data (A8), and associate one or more pieces of information with the detected audio data (A8). If the audio data (A8) is not already associated with a timestamp, the monitoring system control unit 110 may associate the audio data (A8) with a timestamp. Alternatively, or in addition, the monitoring system control unit 110 may associate the audio data (A8) with a property location (e.g., Garage). The monitoring system control unit 110 can transmit the captured audio data (A8) and timestamp (T13) to the monitoring application server 190 for storage and analysis.

In addition, a camera 135 may capture image data (11) of the vehicle 115. The camera 135 may associate the captured image data (11) with a time stamp (T14), and broadcast the captured image data (11) with a timestamp (T14). The monitoring system control unit 110 may detect the broadcasted image data (11), and associate one or more pieces of information with the captured image data (11). If the image data (11) is not already associated with a timestamp, the monitoring system control unit 110 may associate the image data (11) with a timestamp. Alternatively, or in addition, the monitoring system control unit 110 may associate the image data (11) with a property location (e.g., Garage). The monitoring unit 110 can transmit the image data (11) and timestamp (T14) to the monitoring application server 190 for storage and analysis.

In this example, the monitoring application server 190 can learn that the series of activities A7-A8-I1 between a time T12 and T14 is indicative of a person 106 that has arrived home. This activity pattern of A7-A8-I1 is different than the activity patterns described with respect to the dishwasher 150, the dryer 151, and the toilet 152 in a variety of different ways. For example, the activity pattern A7-A8-I1 is different than the activity patterns described with respect to the dishwasher 150, the dryer 151, and the toilet 152 because the activity pattern A7-A8-I1 is based on a different collection of activity data than the respective activity patterns for the dishwasher 150, the dryer 151, and the toilet 152. For example, the series of activities A7-A8-I1 includes image data 11 whereas the activity patterns for the dishwasher 150, dryer 151, and toilet 152 were each based only on sensor data and audio data (and not image data). The monitoring application server 190 can update a local repository of activity patterns for expected events stored on a monitoring system control unit 110 based on the learning of a new activity pattern that corresponds to an expected event.

The monitoring application server 190 or monitoring system control unit 110 may detect future occurrences of the series of activities A7-A8-I1 based on an analysis of real-time (or near real-time) activity data detected from one or more components of the monitoring system 100 and perform one or more operations in response to detecting the series of activities A7-A8-I1. For example, in response to detecting the expected event of a person 106 arriving home, the monitoring application server 190 or monitoring system control unit 110 may instruct one or more lights 160, 161, 162, 163 to turn on.

Other types of operations may also be performed by the monitoring application server 190 in response to the detection of the series of activities A7-A8-I1 indicating that person 106 has arrived home. For example, in response to detecting the series of activities A7-A8-I1, the monitoring system application server 190 or the monitoring system control unit 110 may instruct an HVAC system to turn, instruct a thermostat to set the temperature in the property 101 to a particular temperature, or the like. Alternatively, or in addition, the in response to detecting the series of activities A7-A8-I1, the monitoring application server 190 or monitoring system control unit 110 may instruct one or more connected blinds one or more windows to open, close, or the like. In some implementations, each of the operations may be customized by the user 106 in order to configure the property 101 as the person 106 wants the property to be configured when the person 106 arrives at the property 101.

In some implementations, the monitoring application server 190 may be able to learn what legitimate occupants of the property 101 sound like. For example, the monitoring application server 190 can detect activity data associated with the property 101 that is (i) related to the voice of a legitimate occupant of the property, (ii) related to the footsteps of a legitimate occupant of the property, (iii) or other audio characteristics (e.g., breathing patterns) and can then determine if a subsequently detected voice, subsequently detected footsteps, or a combination thereof, differ from the voice, footsteps, or a combination thereof, of one or more legitimate occupants of the property. For example, a monitoring application server 190, a monitoring system control unit 110, or both, may compare audio characteristics associated with audio data recordings of the voice, the footsteps, or other audio features (e.g., breathing patterns) of a legitimate occupant of the property with audio characteristics captured by one or more microphones of the property 101. Audio characteristics may include the pitch of the sound, the volume of the sound, the sharpness of the sound, the pace of multiple sounds, or the like.

By way of example with reference to FIG. 1, the Living Room may include a listening device such as a camera 130 that includes a microphone 130a, a camera 131 that includes a microphone 131a, and a motion sensor 120a. In the example of FIG. 1, the monitoring system 100 may be in the unarmed state or the armed-home state indicating that a legitimate occupant 102 of the property 101 is present. In some implementations, the motion sensor 120a may generate broadcast sensor data that indicates that an object is moving in the Living Room. In response, a microphone 130a may (i) capture audio data (e.g., a sound recording) of the sound 102a of each footstep of the legitimate occupant's 102 multiple footsteps and (ii) associate a timestamp with the audio data representing each respective footstep. Alternatively, in some implementations, the microphone 130a may capture single audio data recording that comprises sounds of multiple footsteps.

For example, assume that the legitimate occupant takes five footsteps. Then, the camera 130 can use the microphone 130a to capture audio data A9, A10, A11, A12, A13 and associate a respective timestamp T15 to T19 that each respective foot step occurred. The camera 130 can broadcast the captured audio data for each footstep (A9, A10, A11, A12, A13) and a corresponding time stamp (T15 to T19) associated with the audio data for each footstep via the network 140. The monitoring system control unit 110 may detect the broadcasted audio data (A9, A10, A11, A12, A13), and associate one or more pieces of information with the detected audio data (A9, A10, A11, A12, A13). If each audio data recording of a particular footstep (A9, A10, A11, A12, A13) is not already associated with timestamp, the monitoring system control unit 110 may associate the audio data recording of each footstep (A9, A10, A11, A12, A13) with a timestamp. Alternatively, or in addition, the monitoring system control unit 110 may associate the audio data recording (A9, A10, A11, A12, A13) with the property. The monitoring system control unit 110 can transmit the captured audio data (A9, A10, A11, A12, A13) and timestamps (T15 to T19) to the monitoring application server 190 for storage and analysis.

Alternatively, or in addition, a listening device such as camera 130 microphone 130a may also capture audio data (A14) of a person's 102 voice 102b. The audio data (A14) may be broadcasted via network 140 and detected by a monitoring system control unit 110. In some implementations, the monitoring system control unit 110 may associate data with audio data (A14) such as one or more timestamps, a location of the property where the voice data was captured, or the like. The audio data (A14) of the person's 102 voice (A14) and any data that the monitoring system control unit 110 or listening device associates with the audio data (A14) may be transmitted to a monitoring application server 190 for storage and analysis.

The monitoring application server 190 may analyze the audio data (A9, A10, A11, A12, A13) that occurs between a time T15 and T19, the voice data (A14), or both, and generate an occupant signature for the person 102. The monitoring application server 190 may update an occupant signature library on the monitoring system control unit 110 to include the generated occupant signature. The occupant signature library can be used to verify whether sounds (e.g., voice sounds, footstep sounds, breathing, etc.) produced by a person in a property 101 indicate that the person is a legitimate occupant of the property 101 or a likely trespasser.

Figure 2:
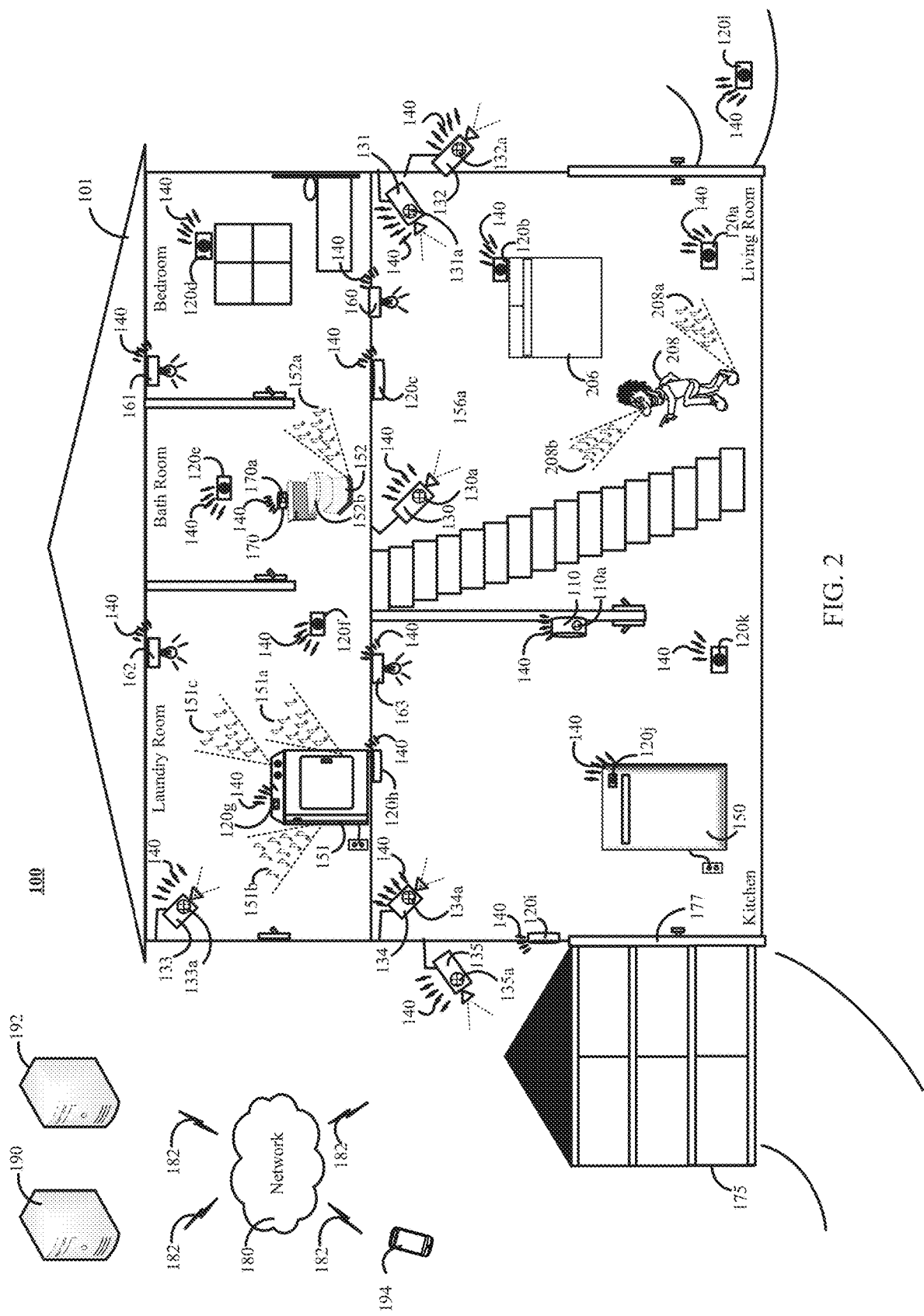
FIG. 2 is a contextual diagram of another example of a monitoring system that can detect an event based on the rhythm and flow of a property.

FIG. 2 is a contextual diagram of another example of a monitoring system 100 that can detect an event based on the rhythm and flow of a property 101.

The monitoring system 100 is the same monitoring system of FIG. 1. In the example of FIG. 2, the monitoring system 100 has learned activity patterns associated with one or more devices such as a toilet 152 and occupant signatures for each of the one or more legitimate occupants of the property 101.

The monitoring system 100 can be used to detect unexpected events at the property 110. In some implementations, an unexpected event may include, for example, an event that is identified based on the occurrence of less than all of the activities in a set of activities that are determined to be indicative of the occurrence of a particular event. Alternatively, in other implementations, an unexpected event may occur when more than all of the activities in a set of activities occur within a predetermined time period.

By way of example, with reference to FIG. 1, the monitoring system 100 can learn, as described above, that the activity pattern such as S5-A5-A6 is indicative of a person using the toilet 152. For example, the motion sensor may detect motion in the Bath Room and generate sensor data (S5), the person may flush the toilet which produces the sound 152a that is captured as audio data (A5), and then the person puts the toilet seat cover 152 down generating a sound 152c. Once the activity pattern S5-A5-A6 is learned, the monitoring system 100 can detect expected events of a person using the toilet, as described above. Such learned events can be useful for the system to monitoring for a variety of reasons, as described below.

With reference to FIG. 2, the monitoring system has learned that the activity pattern S5-A5-A6 is indicative of a person using a toilet. However, during the course of monitoring activity data generated at the property 101, a monitoring system control unit 110, monitoring application server 190, or both, may capture audio data (A5) based on sound 152a. The monitoring system control unit 110, the monitoring application server 190, or both, may determine that the noise 152a is coming from the Bath Room. The monitoring system control unit 110, monitoring application server 190, or both, may determine that audio data A5 is only a portion of the activity pattern S5-A5-A6. For example, the monitoring system control unit 110, the monitoring application server 190, or both, that water is running in the bathroom but no movement in the Bath Room has been detected and no sound was generated by the toilet seat cover 152b. As a result, the monitoring system control unit 110, the monitoring application server 190, or both, can generate and transmit a notification to a user device that prompts a legitimate occupant of the property 101 to investigate a potential leak in the Bath Room. The monitoring system 100 is able to detect an unexpected event such as the toilet leak by determining that less than all of a set of activities associated with a particular event have occurred.

By way of example, with reference to FIG. 1, the monitoring system 100 can learn, as described above, that the activity pattern such as S3-A3-S4-A4 within a time period of (T5) to (T8) is indicative of a person using the dryer 151. For example, the motion sensor 120f may detect motion in the Laundry Room and generate sensor data (S3), a listening device may a capture audio data (A3) indicating that a person shut the door of the dryer producing a sound 152a, the energy sensor 120g may detect power use by the dryer and generate sensor data (S4), and a listening device may capture audio data (A4) of the dryer running and producing the sound 152b. Once the activity pattern S3-A3-S4-A4 is learned, the monitoring system 100 can detect expected events of a person using the dryer, as described above. Such learned events can be also be useful to the monitoring system 100 for a variety of reasons, as described below.

With reference to FIG. 2, for example, the monitoring system 100 can detect unexpected events such as a dryer 151 potentially malfunctioning based on a determination that more than all of the activities in a set of activities is occurring within a particular time period. For example, in addition to the activity pattern S3-A3-54-A4 within a time period of (T5) to (T8), a listening device may also captured and broadcast audio data (A15) of a sound 152c within the time period established by (T5) to (T8). The monitoring application server 190, the monitoring system control unit 110, or both, may determine that the captured audio data (A15) of the sound 152c is indicative of unexpected event because more activities that the expected set of activities occurred with respect to the activity pattern S3-A3-54-A4 within a time period of (T5) to (T8) that is indicative a dryer running. As a result, the monitoring application server 190, the monitoring system control unit 110, or both can generate and transmit a notification to a user device prompting the user to inspect the dryer to ensure that it is functioning correctly. In some implementations, the notification may indicate that an unusual sound that is likely coming from the dryer was detected. In some implementations, the notification may allow a user to playback the detected sound.

As described with reference to FIG. 1, the monitoring system 100 may learn an occupant signature for each legitimate occupant of the property 101. The occupant signature for each occupant of the property 101 may be based on the sounds that the legitimate occupant makes when in the property 101. For example, the occupant signature may be generated based on the sounds 102a a legitimate occupant 102 makes when the legitimate occupant walks, the sounds 102b the legitimate occupant 102 makes when the legitimate occupant 102 talks, and other sounds the legitimate occupant 102 routinely makes (e.g., breathing patterns). In some implementations, the occupant signature may be comprised of multiple sub-signatures for each respective sound (e.g., footsteps, voice, breathing, etc). The monitoring application server 190, monitoring system control unit 110, or both, may store a library of occupant signatures that includes an occupant signature for each legitimate occupant of the property.

The library of occupant signatures may include occupant signatures for legitimate occupants of the property 101 and legitimate guests. For example, the library of occupant signatures may include occupant signatures for permanent occupants of the property 101 who are legitimate occupants. A permanent occupant of the property 101 may include a person that uses the property as the person's primary residence. In addition, in some implementations, the library of occupant signatures may include occupant signatures for temporary occupants of the property 101 who are legitimate guests. A temporary occupant of the property 101 may include a person that visits the property 101 such as a neighbor, an extended family member, a babysitter, a dog walker, or the like.

The monitoring system 100 may learn an occupant signature for a temporary resident in a variety of different ways. For example, while a visitor is present in the property 101 a legitimate occupant of the property 101 may submit a command to the monitoring system control unit 110 directly via one or more controls on the monitoring system control unit 110 or indirectly using a user device connected to the same network as the monitoring system control unit 110 that instructs the monitoring system control unit 110 to learn a new occupant profile. Responsive to the command, the monitoring system control unit 110 may obtain data from one or more monitoring system components such as listening devices over the period of time the guest is present in the property 101. In some implementations, a particular room (or rooms) may include one or more listening devices and be designated a training room where a person such as a guest can go for a few moments to talk, walk, and breathe so that the monitoring system control unit 110 can obtain audio data related to the person (e.g., a guest). The monitoring system control unit 110 can generate an occupant signature based on the obtained audio data. The occupant signature may be stored in the occupant signature library so that the guest does not trigger an alarm the next time the guest visits and the alarm is armed (e.g., armed-home, armed-away, or the like). In some implementations, a system that is "armed-home" may still monitoring occupant signatures of the occupants of the property. However, "armed-home" may disregard motion sensor data because there is expected to be motion in the property when one or more legitimate occupants are home.

The present disclosure need not be so limited to the aforementioned examples for learning an occupant signature for temporary occupants. For instance, an occupant signature of a temporary occupant of the property 101 may be learned in other ways. For example, a guest can use a user device (e.g., smartphone, smart watch, tablet, laptop, desktop, or the like) to transmit the guests occupant profile that was generated and stored by the guests monitoring system control unit, the guests monitoring application server, or both. In some implementations, a monitoring application server 190 may be associated with multiple different user accounts. In such instances, a user may use a user device to log into a user interface where the user can associate the user's occupant signature with one or more other monitoring system control units, one or more other accounts on the same (or different) monitoring application servers, or the like. In such instances, an occupant signature library may be generated and updated to include occupant signatures for both permanent and temporary occupants.

Turn to the example of FIG. 2, the monitoring system 100 can be used to detect whether a trespasser 208 is inside the property 101. In some implementations, the monitoring system 100 can be used to detect a trespasser 208 when other components of the monitoring system 100 such as motion sensors or contact sensors fail to detect the trespasser 208. For example, assume that the in the example of FIG. 2, the trespasser 208 was able to disable the contact sensor 120b and motion sensor 120a.

During the routine monitoring, the monitoring system 100 can capture audio data of sounds in the property 101. After the trespasser 208 disables the contact sensor 120b and motion sensor 120a, the trespasser 208 enters the property 101 and begins to move around the property 101. One or more listening devices such as microphones 130a, 131a can capture audio data (A16) of sounds 208a made by the trespasser's 208 footsteps, audio data (A17) of the sounds 208b made by the trespasser's voice 208, audio data (A18) of the trespasser's breathing, or a combination thereof. The one or more listening devices may broadcast the audio data (A16), (A17), (A18) and one or more timestamps associated therewith via the network 140. The monitoring system control unit 110 can detect the broadcasted audio data (A16), (A17), (A18) and any broadcast therewith. The monitoring system control unit 110 may transmit the broadcasted audio data to the monitoring application server 190. The monitoring application server 190, the monitoring system control unit 110, or both, can generate a potential trespasser signature for the trespasser 208 based on the audio data (A16), (A17), (A18) and any information associated therewith (e.g., one or more timestamps).

The example of FIG. 2 discusses generating a potential trespasser signature for the trespasser 208 within the context of a break-in. However, the present disclosure need not be so limited. For example, the monitoring system 100 can be continuously monitoring the property 101 for potential trespassers. As a result, the monitoring system 100 may generate and evaluate a potential trespasser signature for each person that enters the property 101.

The trespasser's 208 potential trespasser signature may be compared against each occupant signature stored in the monitoring application server 190, the monitoring system control unit 110, or both. Based on the comparison of the occupant signatures and the potential trespasser signature, the monitoring application server 190, the monitoring system control unit 110, or both, can determine whether the potential trespasser that is talking, moving, breathing, or a combination thereof, inside the property 101 is a legitimate occupant of the property. For example, if the occupant signature matches the potential trespasser signature within a predetermined error rate, the monitoring application server 190, the monitoring system control unit 110, or both, may determine that the potential trespasser is legitimate occupant of the property. Alternatively, if the potential trespasser signature does not match one or more stored signatures of a legitimate occupant of the property 101, then the monitoring application server 190, the monitoring system control unit 110, or both, may determine that the potential trespasser signature is associated with a trespasser. In such instances, the monitoring application server 190, the monitoring system control unit 190, or both, may transmit a notification to a central alarm station server 192 indicating the detection of a trespasser. The central alarm station server 192 can notify a law enforcement agency and request that the law enforcement agency dispatch one or more agents to the property 101.

Figure 3:
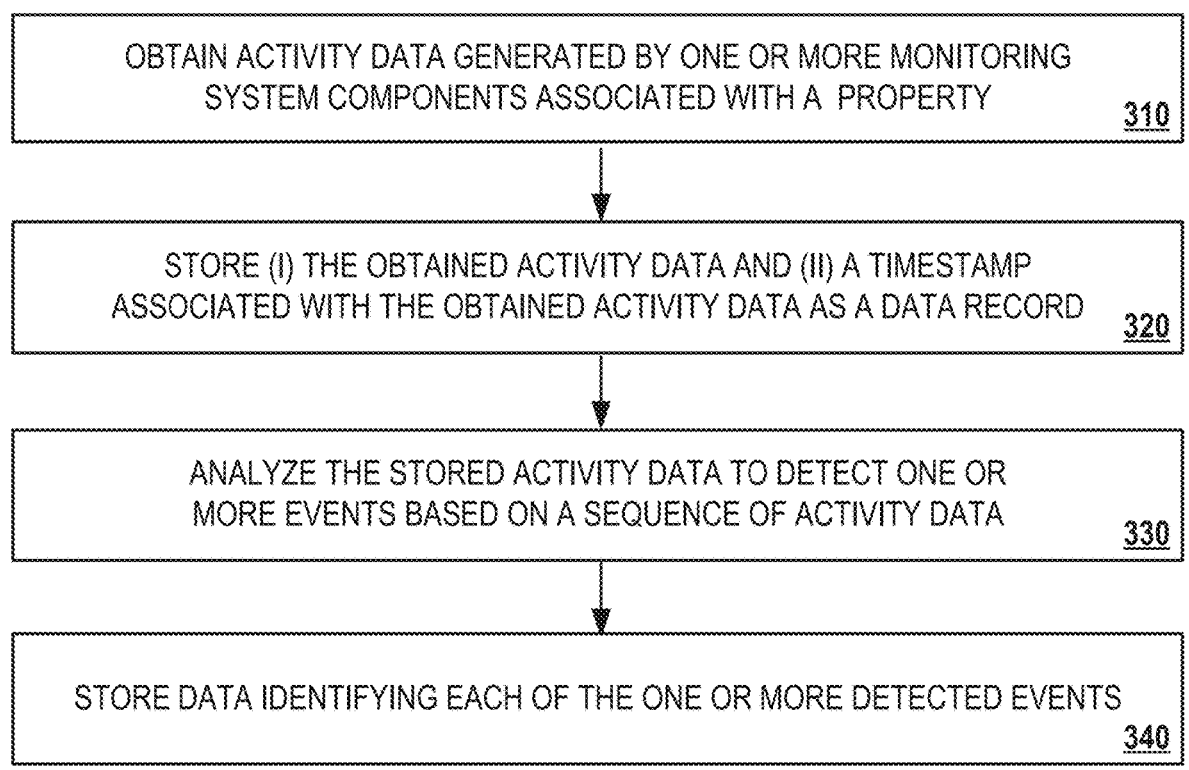
FIG. 3 is a flowchart of an example of a process for learning the rhythm and flow of a property.

FIG. 3 is a flowchart of an example of a process 300 for learning the rhythm and flow of a property. Generally, the process 300 includes obtaining activity data generated by monitoring system components associated with a property (310), storing (i) the obtained activity data and (ii) a timestamp associated with the obtained activity data as a data record (320), analyzing the stored activity data to detect one or more events based on a sequence of activity data (330), and storing data identifying each of the one or more detected events (340). For convenience, the process 300 will be described below as being performed by a monitoring unit such as a monitoring system control unit 110 or a monitoring application server of FIGS. 1 and 2.

In more detail, a monitoring unit can obtain 310 activity data generated by monitoring system components associated with a property. The activity data may include sensor data, image data, audio data, or any other type of data generated by a monitoring system component. Monitoring system components may include sensors, detectors, cameras, listening devices, home assistants, monitoring units, user devices, or the like as shown in FIGS. 1 and 2. By way of example, the monitoring unit may obtain activity data by obtaining sensor data broadcast by one or more sensors, obtaining image data broadcast by one or more cameras, obtaining audio data broadcast by one or more listening devices, or the like.

The monitoring unit can store 320 (i) the obtained activity data and (ii) a timestamp associated with the obtained activity data as a data record. In some implementations, the obtained activity data may be associated with a timestamp at the time the activity data was obtained. For example, the monitoring system component that generated the activity data may associate the timestamp with the activity data and broadcast the activity data and time stamp. Alternatively, the monitoring unit may associate at timestamp with the activity data upon the detection of the generated activity data.

The monitoring unit can analyze 330 the stored activity data to detect one or more events based on a sequence of activity data. For example, the monitoring unit may analyze the stored activity data to identify patterns in the activity data indicative of an event. For example, the monitoring unit can detect that a pattern of activities such as S3-A3-S4-A4 indicating that an sensor data (S3) was detected that indicates an object was moving in the vicinity of a dryer, audio data (A3) was captured indicating the dryer door was closed, sensor data (S4) was detected indicating that the dryer started using power, and audio data (A4) was captured indicating that the dryer started making noises indicative of operation (e.g., sound of motor running, sound of water running, sound of water spraying, a combination thereof, or the like).

In some implementations, the monitoring unit can determine with more than threshold level of certainty that an identified activity pattern is associated with an event without further feedback from a user. In other implementations, the monitoring unit can determine with more than a threshold level of certainty that an identified activity pattern is associated with an event and transmit a notification to a user device that prompts a user to confirm that identified activity pattern is associated with the event. In other implementations, the monitoring unit can detect an identified activity pattern, and transmit a notification to a user device that asks the user if the user knows whether the identified activity pattern is associated with an event. In some implementations, the notification may include information identifying the type of sensor data detected, recordings of the audio sounds detected, portions of the property where the sensor data was generated, portions of the property where the audio sounds occurred, or the like.

The monitoring unit can store 340 data identifying each of the one or more detected events. For example, the monitoring unit can update a database of known expected events that are associated with a property.

Figure 4:
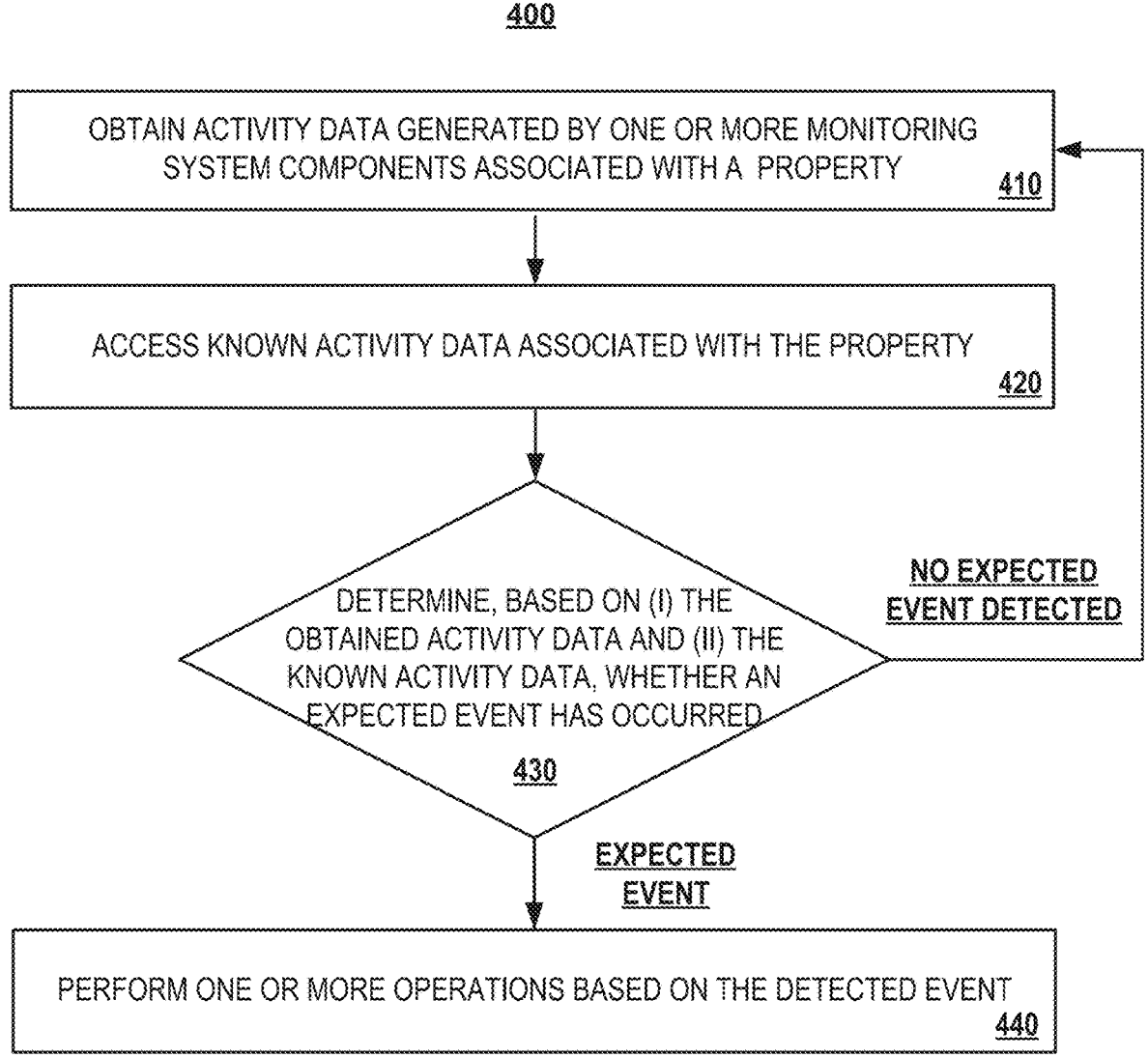
FIG. 4 is a flowchart of an example of a process for detecting an expected event based on the rhythm and flow of the property.

FIG. 4 is a flowchart of an example of a process 400 for detecting an expected event based on the rhythm and flow of the property. Generally, the process 400 includes obtaining activity data generated by one or more monitoring system components associated with the property (410), accessing known activity data associated with the property (420), and determining, based on (i) the obtained activity data and (ii) the known activity data, whether an expected event has occurred (430). In response to determining that an expected event has not occurred, the process 400 continues at stage 410 by obtaining activity data generated by one or more monitoring system components associated with the property (410). In response to determining that an expected event has occurred, the process 400 continues by performing one or more operations based on the detected event (440). For convenience, the process 400 will be described below as being performed by a monitoring unit such as a monitoring system control unit 110 or a monitoring application server of FIGS. 1 and 2.

In more detail, a monitoring unit can obtain 410 activity data generated by one or more monitoring system components associated with the property. The activity data may include a particular sequence of sensor data, image data, audio data, or any other type of data generated by a monitoring system component. For example, the monitoring unit can detect that a sequence of activity data such as S3-A3-S4-A4 within a particular time period from a first time T5 to a second time T8. For example, the sequence of activity data such as S3-A3-S4-A4 may include sensor data (S3) that indicates an object was moving in the vicinity of a dryer, audio data (A3) indicating the dryer door was closed, sensor data (S4) indicating that the dryer started using power, and audio data (A4) indicating that the dryer started making noises indicative of operation (e.g., sound of motor running, sound of water running, sound of water spraying, a combination thereof, or the like).

The monitoring unit can access 420 known activity data associated with the property. For example, the monitoring unit can access a database of known activity patterns that each correspond to a particular event. The database of known activity data sequences may include one or more activity data sequences that each have been learned by the monitoring unit as corresponding to a respective existing event at the property. For example, the database of known activity data may store one or more data records that associate a particular activity data sequence of S3-A3-S4-A4 detected within a particular time period T5 to T8 with an event of a dyer drying clothes.

The monitoring unit can determine 430, based on (i) the obtained activity data and (ii) the known activity data, whether an expected event has occurred. For example, the monitoring unit can perform a search of the database of known activity data sequences to determine whether any known activity data sequences match the obtained activity data. For example, the monitoring unit may determine whether there are any known activity data sequences that correspond to the sequence of activity data S3-A3-S4-A4 obtained in stage 410. In some implementations, the obtained activity data may be determined to match a known activity pattern if the comparison between the obtained activity data and a known activity pattern exceeds a predetermined similarity threshold.

In some implementations, an obtained activity data sequence may only match a known activity data sequence if the obtained activity data sequence occurred within a same period of time as the known activity data sequence. In such instances, an obtained activity data sequence of S3-A3-S4-A4 that occurred within a period of time of T5 to T16 (e.g., 2 minutes) may not match a known activity data sequence of S3-A3-S4-A4 that occurs between T5 to T8 (e.g., 40 seconds). In other words, an obtained sequence of activity data may only be indicative of a particular event if the sequence of activity data occurs within approximately the same period of time as the known activity data sequence. In other implementations, an obtained activity data sequence may be determined to match a known activity data sequence independent of any time constraints on the respective activity data sequences.

In response to determining that an expected event has not occurred, the monitoring unit may continue monitoring the property by obtaining 410 activity data generated by one or more monitoring system components associated with the property. That is, the monitoring unit can begin performance of process 400 again.

In response to determining that an expected event has occurred, the monitoring unit may perform 440 one or more operations based on the detection of the expected event. The operations may include generating and transmitting one or more notifications to a user device. For example, in response to detecting the expected event of a dryer drying clothes, the monitoring unit may generate and transmit a notification to user device to ask the user whether the user emptied the lint trap. Other types of notifications may be generated and transmitted based on the detected event. Alternatively, or in addition, the operations may include generating and transmitting one or more instructions that instruct a component of a monitoring system to perform a particular action (e.g., turn off a light, turn on a light, close blinds, open blinds, lock a door, unlock a door, turn on a camera, turn off a camera, or the like).

Figure 5:
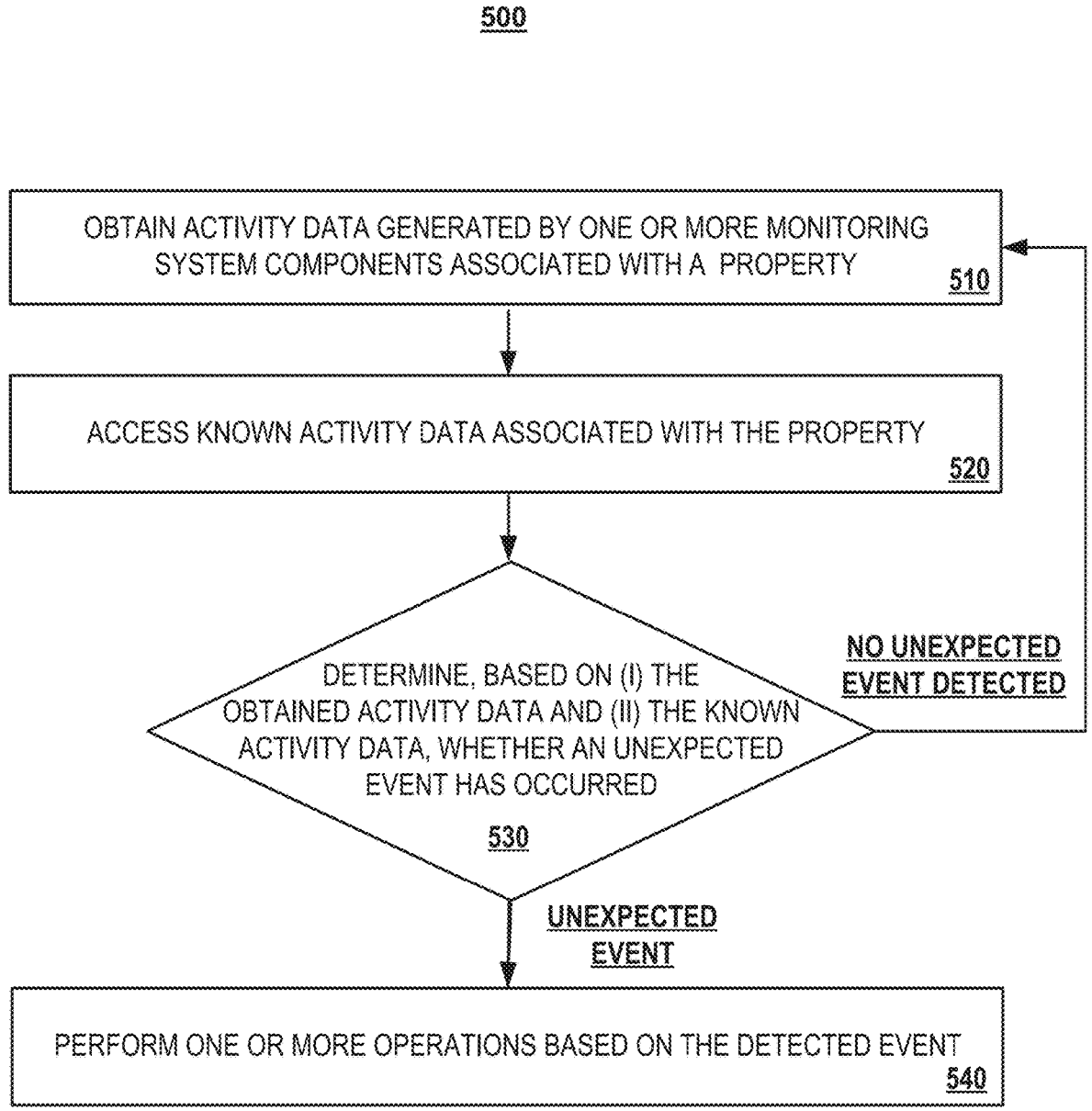
FIG. 5 is a flowchart of an example of a process for detecting an unexpected event based on the rhythm and flow of the property.

FIG. 5 is a flowchart of an example of a process 500 for detecting an unexpected event based on the rhythm and flow of the property. Generally, the process 500 includes obtaining activity data generated by one or more monitoring system components associated with the property (510), accessing known activity data associated with the property (520), and determining, based on (i) the obtained activity data and (ii) the known activity data, whether an unexpected event has occurred (530). In response to determining that an unexpected event has not occurred, the process 500 continues at stage 510 by obtaining activity data generated by one or more monitoring system components associated with the property (510). In response to determining that an unexpected event has occurred, the process 500 continues by performing one or more operations based on the detected event (540). For convenience, the process 500 will be described below as being performed by a monitoring unit such as a monitoring system control unit 110 or a monitoring application server of FIGS. 1 and 2.

In more detail, a monitoring unit can obtain 510 activity data generated by one or more monitoring system components associated with the property. The activity data may include particular sequence one or more of sensor data, image data, audio data, or any other type of data generated by a monitoring system component. For example, the monitoring unit can detect the particular sequence of activity data S3-A3-S4-A4-A15. In this example, the particular sequence of activity data S3-A3-S4-A4-A15 may detected based on sensor data (S3) indicating motion of one or more objects in the Laundry Room, audio data (A3) indicating a sound of a dryer door closing, sensor data (S4) indicating that the dryer is using power, audio data (A4) indicating that a motor of the dryer is running, and audio data (A15) indicative of another sound in the Laundry Room.

The monitoring unit can access 520 known activity data associated with the property. For example, the monitoring unit can access a database of known activity patterns that each correspond to a particular event. The database of known activity patterns may include one or more activity patterns that have been learned by the monitoring unit as being indicative of a respective existing event at the property. For example, the database of known activity patterns may store one or more data records that associate an activity pattern of S3-A3-S4-A4 detected within a particular time period T5 to T8 with an event of a dyer drying clothes.

The monitoring unit can determine 530, based on (i) the obtained activity data and (ii) the known activity data, whether an unexpected event has occurred. For example, the monitoring unit can determine, based on a search of the database of known activity data sequences, whether the obtained activity data includes less than or more than all of the activity data items of a known a known activity data sequence that is known to correspond to a particular event. For example, the monitoring unit may determine that the sequence of activity data S3-A3-S4-A4-A15 includes more activity data items than the known activity data sequence S3-A3-S4-A4. In this example, the monitoring unit may identify the sequence of activity data S3-A3-S4-A4-A15 is indicative of an unexpected event such as a malfunctioning dryer because there is an additional sound that is detected while the dryer is running.

In response to determining that an unexpected event has not occurred, the monitoring unit may continue monitoring the property by obtaining 510 activity data generated by one or more monitoring system components associated with the property. That is, the monitoring unit can begin performance of process 500 again.

In response to determining that an unexpected event has occurred, the monitoring unit may perform 540 one or more operations based on the detection of the unexpected event. The operations may include generating and transmitting one or more notifications to a user device. For example, in response to detecting the unexpected event of an additional sound produced while the dryer is running, the monitoring unit may generate and transmit a notification to user device to alert the user that the dryer may be malfunctioning. Other types of notifications may be generated and transmitted based on the detected event. Alternatively, or in addition, the operations may include generating and transmitting one or more instructions that instruct a component of a monitoring system to perform a particular action (e.g., turn off a light, turn on a light, close blinds, open blinds, lock a door, unlock a door, turn on a camera, turn off a camera, or the like).

An additional source of audio sounds in a house may include the pipes of the house. As water or any other material flows through a pipe, the pipe may vibrate and produce audio that a microphone may be able to detect. This audio may be combined with other data from motion sensors, contact sensors, energy usage monitors, and/or any other similar sensor to determine what device is using water.

To detect audio from a pipe, a microphone may be attached to the pipe. The microphone may be able to detect the audio of the pipe when a toilet flushes or another device or appliance uses water. The microphone may be able to detect audio that is outside of the audible range.

To take advantage of this audio data, the system may have a learning period where the system collects audio data form the microphones, sensor data from the sensors in the property, and data identifying the device or appliance that is being used. For example, the microphone detects a noise coming from the pipe with water moving through the pipe. An electrical sensor detects an energy spike that matches the motor of an appliance. A motion sensor may detect motion in the kitchen. In this case, the system may determine that the dishwasher likely is running. The system may ask the user to confirm that the dishwasher is running. If the user confirms that the dishwasher is running, then the system may add the collected data to the training data.

The system may collect additional training data. For example, the microphone detects a noise coming from the pipe with water moving through the pipe. A motion sensor may detect motion in the bathroom. In this case, the system may determine that the shower is running. The system may ask a user to confirm that the shower is or was running during the time period when the audio was detected. The user may indicate that the toilet was used during that time instead. The system may use that audio and sensor data and its relationship to the toilet flushing as training data.

With multiple training samples, the system may use machine learning to train a model that is configured to receive audio data from the microphone and determine an appliance or device that is consuming the water. In some implementations, the model may be trained to also receive sensor data as an input. The sensor data may be collected at the same time as the microphone data.

In some implementations, the model may be configured to determine when there are potential problems with the water consuming devices or appliances. For example, the model may be able to determine that the dishwasher is consuming water, but that the dishwasher is consuming more water than normal. The system may provide a notification to the user indicating that the dishwasher may need a repair.

Additionally, or alternatively, the system may determine that water is being used in the property based on the audio data. However, there may not be any motion detected in the house. In this case, the system may generate a notification indicating that water is being used at the property and send the notification to the resident.

In some implementations, the audio detected by the microphone may not originate from water moving through the pipe. Other noises may travel through the pipes, especially if something like a motor is near a pipe. For example, the pump of the washing machine may generate sound that travels down the pipes and is detected by the microphone. This audio may be part of the washing machine signature.

In some implementations, there may be multiple microphones located on water pipes throughout a house. The system may receive data indicating the location of each microphone, such as the nearest room. In some implementations, a microphone may include an accelerometer. The accelerometer data can be part of the training data and included with the audio data when the microphone provides data to the system. In some implementations, the system may train models that are specific to a single property or that are applicable to multiple properties.

Figure 5A:
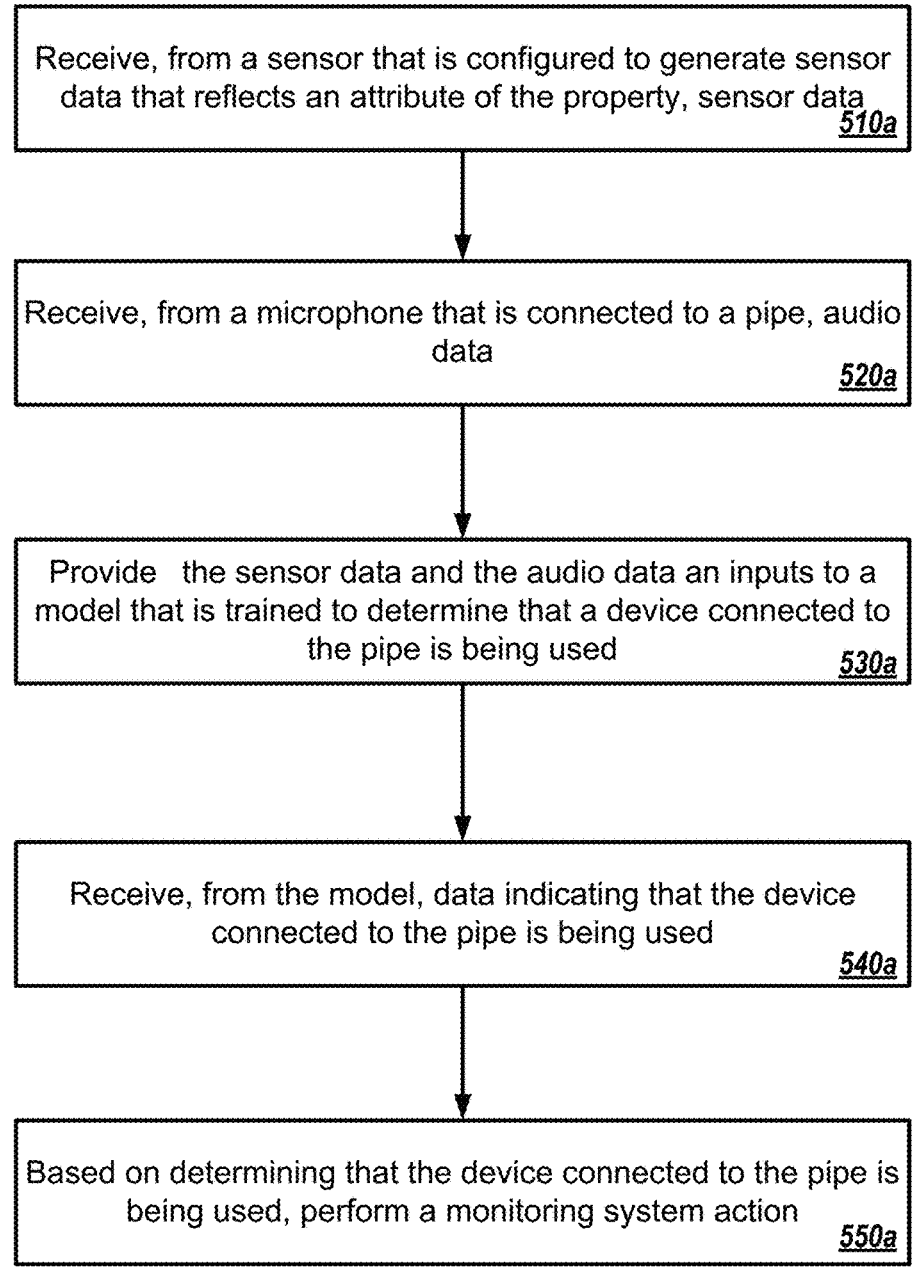
FIG. 5A is a flowchart of an example of a process for detecting water usage based on audio data detected from a pipe of the property.

FIG. 5A is a flowchart of an example of a process 500*a* for detecting water usage based on audio data detected from a pipe of the property. In general, the process 500*a* receives audio data from a microphone connected to a pipe and sensor data from a sensor of the property. The process 500*a* provides the audio data and sensor data to a model. The model identifies a likely appliance or device that is consuming water. Based on that determination, the process 500*a* performs an action. The process 500*a* will be described as being performed by a computer system comprising one or more computers that is configured to monitor a property, for example, the system 100 of FIG. 1, system 200 of FIG. 2, and/or system 600 of FIG. 6.

The system receives, from a sensor that is configured to generate sensor data that reflects an attribute of the property, sensor data (510*a*). In some implementations, the sensor is a motion sensor that detects motion in an area of the property. In some implementations, the sensor is an electrical sensor that reflects electrical usage of the property or at a particular outlet or breaker of the property. In some implementations, the sensor is one of the other sensors of the monitoring system such as a window/door sensor, a camera, a glass break sensor, or any other type of sensor. In some implementations, the system may receive data indicating a location of the sensor. This location data may be received in advance, such as when the sensor is added to the system and/or when the sensor provides the sensor data.

The system receives, from a microphone that is connected to a pipe, audio data (520*a*). In some implementations, the microphone is attached to the outside of the pipe and is acoustically isolated from the rest of the property. This way, the microphone detects audio emanating from the pipe without detecting audio from elsewhere in the property. In some implementations, the system may receive data indicating a location of the microphone. This location data may be received in advance, such as when the microphone is added to the system and/or when the microphone provides the audio data to the system. In some implementations, the system activates the microphone in response to a particular condition detected based on the sensor data. For example, if a motion sensor detects motion that satisfies a motion threshold, then the system activates the microphone. The time period that the system activates the microphone for may be based on a difference between the motion threshold and the motion. A larger difference may cause the system to activate the microphone for longer or vice versa. In some implementations, the activation time may be fixed. In some implementations, the microphones are active and transmitting audio data continuously to the system.

The system provides the sensor data and the audio data an inputs to a model that is trained to determine that a device connected to the pipe is being used (530*a*). In some implementations, the system trains the model using machine learning. The system receives historical data that includes past sensor data, past audio data, data indicating a device that is being used. The device may be one that consumes water. The device may also be a faucet, shower, sprinkler, or any other part of the property that outputs water. The historical data may be grouped into training samples. For example, while the dishwasher is on, the sensor data and the audio data may be collected and grouped as a training sample and labeled with the dishwasher being on. There may be other training samples collected during other times when the dishwasher is on. In some implementations, there may be more than one device or appliance consuming water. In this case, the sensor data and the audio data may be grouped in a training sample that is labeled with multiple appliances or devices such as the washing machine and the shower. In some implementations, each training sample may be labeled with the state of each water consuming device at the property. For example, a training sample may indicate that the dishwasher is on, the washing machine is off, the sprinkler is off, the shower is on, and any other state of the water consuming devices.

In some implementations, the system may label each training sample using feedback from a user or resident of the property. The system may estimate a device that is consuming water based on the sensor data. For example, the system may estimate that the bathroom sink is consuming water based on motion detected in the bathroom. The system may provide this guess to the resident. The resident may confirm that the bathroom faucet was consuming water at that time or that another water consuming device was using water during that time. The system may confirm guesses for each training sample with a user or resident before adding the training sample to the training data.

The system may use machine learning to train the model using the training samples. The system may train a model for a specific property using training samples from that property. The system may train a model with training samples from multiple properties for use at multiple properties. The system may train the model to receive the audio data from the microphone and sensor data from a sensor and to output a likely device that is or likely devices that are consuming water. In some implementations, the training data may also include the location of the microphone and the location of the sensor. In this case, the system may train the model to receive the audio data, the sensor data, the location of the microphone, and the location of the sensor and output a likely device that is or likely devices that are consuming water.

The system receives, from the model, data indicating that the device connected to the pipe is being used (540a). In some implementations, the sensor data is data from a motion sensor. The model indicates that the location of the sensor is likely the location where water is being consumed. For example, the sensor is in the bathroom, and the model indicates that water is likely being used in the bathroom. In some implementations, the data is from an electrical sensor. The electrical signature of an appliance, such as the washing machine, may match the electrical sensor data. In this case, the model may indicate that the washing machine is likely being used.

In some implementations, the model may be a rule-based model. The system may generate the rules based on the training data. A rule may indicate that if there is motion in the bathroom and water is being used, then a device in the bathroom is consuming water. Another rule may indicate may indicate that if the back door was unlocked and opened and water is being used, then the device consuming water may be an outdoor faucet.

Based on determining that the device connected to the pipe is being used, the system performs a monitoring system action (550a). In some implementations, the action may include a notification to the resident that water is being used and data identifying the device using water. In some instances, the resident may confirm that the notification is correct or indicate that the notification is not correct. The system may update the model by retraining the model using the confirmation from the user and the corresponding sensor data and audio data. In some implementations, the action may be to activate an alarm. This may occur if the water usage appears to be high enough to suggest a leak or flooding. For example, the model may indicate that the water has been running in the bathroom for greater than a threshold time period, such as two hours. Based on this determination, the system may activate an alarm. In some implementations, system may identify the monitoring system action based on the arming status of the monitoring system. For example, if the model determines that a device in the bathroom is likely consuming water and the monitoring system is armed-away, then monitoring system action may be to activate an alarm. If the monitoring system is unarmed, then the action may be to send a notification to the resident.

In some implementations, the arming status of the monitoring system may be part of the training data and used as an input to the model. In this case, the training samples include audio data, sensor data, the arming status of the monitoring system are labeled with the device or devices consuming water. The model may be configured to receive audio data, sensor data, and the arming status of the monitoring system and output a likely device or devices that are consuming water.

Figure 6:
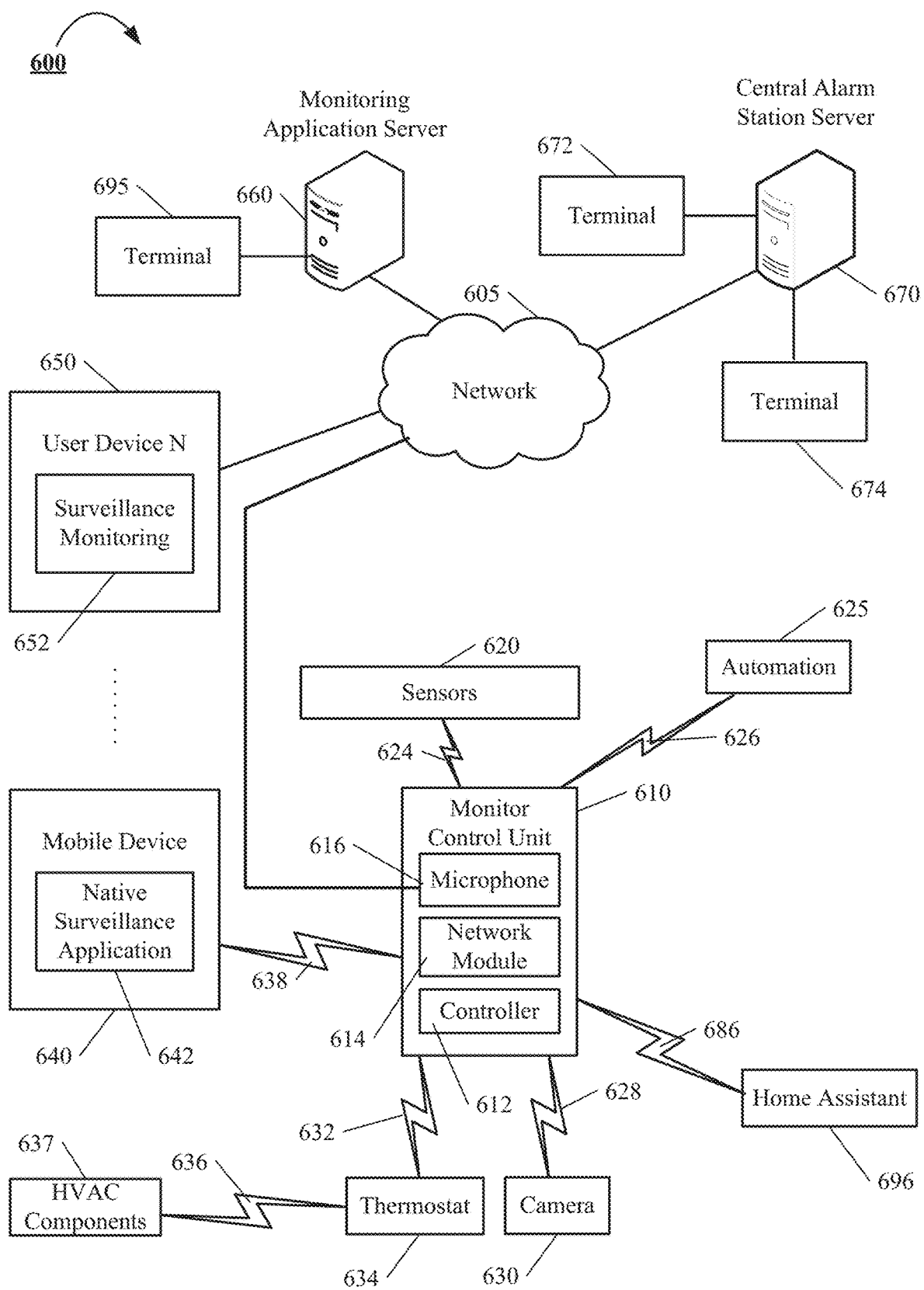
FIG. 6 is a block diagram of an example of a monitoring system for detecting an event based on the rhythm and flow of a property.

FIG. 6 is a block diagram of an example of a monitoring system 600 for detecting an event based on the rhythm and flow of a property The electronic system 600 includes a network 605, a monitoring system control unit 610, one or more user devices 640, 650, a monitoring application server 660, and a central alarm station server 670. In some examples, the network 605 facilitates communications between the monitoring system control unit 610, the one or more user devices 640, 650, the monitoring application server 660, and the central alarm station server 670.

The network 605 is configured to enable exchange of electronic communications between devices connected to the network 605. For example, the network 605 may be configured to enable exchange of electronic communications between the monitoring system control unit 610, the one or more user devices 640, 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The monitoring system control unit 610 includes a controller 612 and a network module 614. The controller 612 is configured to control a monitoring system (e.g., a home alarm or security system) that includes the monitoring system control unit 610. In some examples, the controller 612 may include a processor or other control circuitry configured to execute instructions of a program that controls operation of an alarm system. In these examples, the controller 612 may be configured to receive input from sensors, detectors, or other devices included in the alarm system and control operations of devices included in the alarm system or other household devices (e.g., a thermostat, an appliance, lights, etc.). For example, the controller 612 may be configured to control operation of the network module 614 included in the monitoring system control unit 610. In some implementations, the monitoring system control unit 610 may include a microphone 616.

The system 600 is configured to use a monitoring system control unit 610, a monitoring application server 660, or both, to monitor sequences of activity data produced by a property as described with reference to FIGS. 1-5. A sequence of activity data may two more data items such as sensor data, image data, audio data, or a combination thereof that occur within a particular period of time. For example, the monitoring system control unit 610 may be configured to detect, capture, or both, activity data and transmit the activity data to the monitoring application server 660 for analysis. The monitoring application server 660 can analyze the activity data to identify patterns (or sequences) of activity data that are indicative of a respective events. The monitoring application server 660 can provide to a monitoring system control unit 610, and subsequently update, a library of known activity sequences that includes a plurality of activity sequences that each correspond to a particular event.

The monitoring system control unit 610 may store the library of known activity sequences and use the library of known activity sequences to detect the occurrence of events. For example, the monitoring system control unit 610 may detect a sequence of activity data and compare the detected sequence of activity data to the activity sequences in the library of known activity sequences. The monitoring system control unit 610 may determine, based on the aforementioned comparison, whether a detected sequence of activity data is indicative of a particular expected event. In response to determining that the detected sequence of activity data is indicative of a particular expected event, the monitoring system control unit 610 may perform one or more operations. For example, the monitoring system control unit 610 may transmit one or more notifications based on the detected expected event. Alternatively, the monitoring system control unit 610 may instruct one or more other components of the monitoring system 600 to perform one or more actions. Actions may include, for example, turning on a light, turning off a light, unlocking a door, locking a door, opening blinds, closing blinds, turning on a camera, turning off a camera, or the like.

The monitoring system control unit 610 may also be configured to detect unexpected events using the library of known activity sequences. For example, the monitoring system control unit 610 may be configured to detect one or more activity data items and compare the one or more activity data items to the library of known activity sequences. An unexpected event may be detected based on a determination that the detected one or more activity data items are related to a known activity sequence but includes less activity data items than or more activity data items than the known activity sequence. The monitoring system control unit 610 perform one or more operations based on the detection of an unexpected event. For example, the monitoring system control unit 610 may transmit one or more notifications based on the detection of the unexpected event. Alternatively, the monitoring system control unit 610 may instruct one or more other components of the monitoring system 600 to perform one or more actions based on the detection of the unexpected event. Actions may include, for example, turning on a light, turning off a light, unlocking a door, locking a door, opening blinds, closing blinds, turning on a camera, turning off a camera, turning off a water shutoff valve, or the like.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the monitoring system control unit 610 to communicate over a local area network and/or the Internet. The network module 614 also may be a voiceband modem configured to enable the alarm panel to communicate over the telephone lines of Plain Old Telephone Systems (POTS).

The monitoring system that includes the monitoring system control unit 610 includes at least one sensor 620. In some implementations, the monitoring system may include multiple sensors 620. Each sensor 620 may include at least one sensor (or detector).

The sensor 620 may include a contact sensor, a motion sensor, a glass break sensor, or any other type of sensor included in an alarm system or security system. The sensor 620 also may include an environmental sensor, such as a temperature sensor, a water sensor, a rain sensor, a wind sensor, a light sensor, a smoke detector, a carbon monoxide detector, an air quality sensor, etc. The sensor 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensor units 620 may include a radio-frequency identification (RFID) sensor that identifies a particular article that includes a pre-assigned RFID tag. Each respective type of sensor (or detector) is configured to generate data which can be used to detect a potential event at a property.

In some instances, one or more sensors 620 may include a microphone. In such instances, the sensor 620 can use the microphone to function as a listening device. In such instances, the sensor microphone can capture audio data, and transmit the audio data to the monitoring system control unit 610, monitoring application server 660, or both, for analysis. In some implementations, sensor 620 is configured to associate a timestamp with the captured audio data prior to transmitting the captured audio data. However, not all sensors 620 are required to include a microphone, and in some implementations of the monitoring systems there may not be any sensors 620 that include a microphone. In other implementations, all sensors 620 in a particular monitoring system may include a microphone. In yet other implementations, a subset of sensors 620 in a monitoring system may include a microphone and a subset of the sensors 620 in the monitoring system may not include a microphone.

The system 600 may also include a home assistant 696. The home assistant 696 may include a microphone that can be used to capture audio data. The home assistant 696 can be configured to transmit the captured audio data to a monitoring system control unit 610, monitoring application server 660, or both. In some implementations, home assistant 696 is configured to associate a timestamp with the captured audio data prior to transmitting the captured audio data.

The camera 630 may be a video/photographic camera or other type of optical sensing device configured to capture images. For instance, the camera 630 may be configured to capture images of an area within a building monitored by the monitoring system control unit 610. The camera 630 may be configured to capture single, static images of the area and also video images of the area in which multiple images of the area are captured at a relatively high frequency (e.g., thirty images per second). The camera 630 may be controlled based on commands received from the monitoring system control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensor 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the module 625, etc.) to improve image quality when the scene is dark. An integrated or separate light sensor may be used to determine if illumination is desired and may result in increased image quality.

The camera 630 may include a microphone that can be used to capture sound data. The camera 630 can be configured to transmit the captured audio data to a monitoring system control unit 610, monitoring application server 660, or both. In some implementations, camera 630 is configured to associate a timestamp with the captured audio data prior to transmitting the captured audio data.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the monitoring system control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the monitoring system control unit 610 and the camera 630 receives commands related to operation from the monitoring application server 660.

The system 600 also includes a thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the monitoring system control unit 610 and can control the environmental (e.g., temperature) settings based on commands received from the monitoring system control unit 610.

In some implementations, the thermostat 634 is a dynamically programmable thermostat and can be integrated with the monitoring system control unit 610. For example, the dynamically programmable thermostat 634 can include the monitoring system control unit 610, e.g., as an internal component to the dynamically programmable thermostat 634. In addition, the monitoring system control unit 610 can be a gateway device that communicates with the dynamically programmable thermostat 634.

A module 625 is connected to one or more components of an HVAC system associated with a property, and is configured to control operation of the one or more components of the HVAC system. In some implementations, the module 625 is also configured to monitor energy consumption of the HVAC system components, for example, by directly measuring the energy consumption of the HVAC system components or by estimating the energy usage of the one or more HVAC system components based on detecting usage of components of the HVAC system. The module 625 can communicate energy monitoring information and the state of the HVAC system components to the thermostat 634 and can control the one or more components of the HVAC system based on commands received from the thermostat 634.

The sensors 620, the module 625, the camera 630, the thermostat 634, and the home assistant 696 can communicate with the controller 612 over communication links 627, 626, 628, 632, 638, and 686. The communication links 627, 626, 628, 632, 638, and 686 may be a wired or wireless data pathway configured to transmit signals from the sensors 620, the module 625, the camera 630, the thermostat 634, and the home assistant 696 to the controller 612. The sensors 620, the module 625, the camera 630, the thermostat 634, and the home assistant 696 may continuously transmit sensed values to the controller 612, periodically transmit sensed values to the controller 612, or transmit sensed values to the controller 612 in response to a change in a sensed value.

The communication links 627, 626, 628, 632, 638, and 686 may include a local network. The sensors 620, the module 625, the camera 630, the thermostat 634, the home assistant 696, and the controller 612 may exchange data and commands over the local network. The local network may include 802.11 "Wi-Fi" wireless Ethernet (e.g., using low-power Wi-Fi_____33 chipsets), Z-Wave, ZigBee, Bluetooth, "Homeplug" or other "Powerline" networks that operate over AC wiring, and a Category 6 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the monitoring system control unit 610, the one or more user devices 640, 650, and the central alarm station server 670 over the network 605. For example, the monitoring application server 660 may be configured to monitor events (e.g., alarm events) generated by the monitoring system control unit 610. In this example, the monitoring application server 660 may exchange electronic communications with the network module 614 included in the monitoring system control unit 610 to receive information regarding events (e.g., alarm events) detected by the monitoring system control unit 610. The monitoring application server 660 also may receive information regarding events (e.g., alarm events) from the one or more user devices 640, 650.

In some examples, the monitoring application server 660 may route alarm data received from the network module 614 or the one or more user devices 640, 650 to the central alarm station server 670. For example, the monitoring application server 660 may transmit the alarm data to the central alarm station server 670 over the network 605.

The monitoring application server 660 may store sensor and image data received from the monitoring system and perform analysis of sensor and image data received from the monitoring system. Based on the analysis, the monitoring application server 660 may communicate with and control aspects of the monitoring system control unit 610 or the one or more user devices 640, 650.

The monitoring application server 660 may, in some implementations, be configured to perform any of the functionality described here related to the monitoring system control units 110, 610, the monitoring application server 190, or both.

The central alarm station server 670 is an electronic device configured to provide alarm monitoring service by exchanging communications with the monitoring system control unit 610, the one or more mobile devices 640, 650, and the monitoring application server 660 over the network 605. For example, the central alarm station server 670 may be configured to monitor alarm events generated by the monitoring system control unit 610. In this example, the central alarm station server 670 may exchange communications with the network module 614 included in the monitoring system control unit 610 to receive information regarding alarm events detected by the monitoring system control unit 610. The central alarm station server 670 also may receive information regarding alarm events from the one or more mobile devices 640, 650 and/or the monitoring application server 660.

The central alarm station server 670 is connected to multiple terminals 672 and 674. The terminals 672 and 674 may be used by operators to process alarm events. For example, the central alarm station server 670 may route alarm data to the terminals 672 and 674 to enable an operator to process the alarm data. The terminals 672 and 674 may include general-purpose computers (e.g., desktop personal computers, workstations, or laptop computers) that are configured to receive alarm data from a server in the central alarm station server 670 and render a display of information based on the alarm data. For instance, the controller 612 may control the network module 614 to transmit, to the central alarm station server 670, alarm data indicating that a sensor 620 detected a door opening when the monitoring system was armed. The central alarm station server 670 may receive the alarm data and route the alarm data to the terminal 672 for processing by an operator associated with the terminal 672. The terminal 672 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640, 650 are devices that host and display user interfaces. For instance, the user device 640 is a mobile device that hosts one or more native applications (e.g., the native surveillance application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a native surveillance application 642. The native surveillance application 642 refers to a software/firmware program running on the corresponding mobile device that enables the user interface and features described throughout. The user device 640 may load or install the native surveillance application 642 based on data received over a network or data received from local media. The native surveillance application 642 runs on mobile devices platforms, such as iPhone, iPod touch, Blackberry, Google Android, Windows Mobile, etc. The native surveillance application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the monitoring system control unit 610 over the network 605. The user device 650 may be configured to display a surveillance monitoring user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640, 650 communicate with and receive monitoring system data from the monitoring system control unit 610 using the communication link 638. For instance, the one or more user devices 640, 650 may communicate with the monitoring system control unit 610 using various local wireless protocols such as Wi-Fi, Bluetooth, Z-Wave, ZigBee, HomePlug (Ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640, 650 are shown as communicating with the monitoring system control unit 610, the one or more user devices 640, 650 may communicate directly with the sensors and other devices controlled by the monitoring system control unit 610. In some implementations, the one or more user devices 640, 650 replace the monitoring system control unit 610 and perform the functions of the monitoring system control unit 610 for local monitoring and long range/offsite communication.

In other implementations, the one or more user devices 640, 650 receive monitoring system data captured by the monitoring system control unit 610 through the network 605. The one or more user devices 640, 650 may receive the data from the monitoring system control unit 610 through the network 605 or the monitoring application server 660 may relay data received from the monitoring system control unit 610 to the one or more user devices 640, 650 through the network 605. In this regard, the monitoring application server 660 may facilitate communication between the one or more user devices 640, 650 and the monitoring system.

In some implementations, the one or more user devices 640, 650 may be configured to switch whether the one or more user devices 640, 650 communicate with the monitoring system control unit 610 directly (e.g., through link 638) or through the monitoring application server 660 (e.g., through network 605) based on a location of the one or more user devices 640, 650. For instance, when the one or more user devices 640, 650 are located close to the monitoring system control unit 610 and in range to communicate directly with the monitoring system control unit 610, the one or more user devices 640, 650 use direct communication. When the one or more user devices 640, 650 are located far from the monitoring system control unit 610 and not in range to communicate directly with the monitoring system control unit 610, the one or more user devices 640, 650 use communication through the monitoring application server 660.

Although the one or more user devices 640, 650 are shown as being connected to the network 605, in some implementations, the one or more user devices 640, 650 are not connected to the network 605. In these implementations, the one or more user devices 640, 650 communicate directly with one or more of the monitoring system components and no network (e.g., Internet) connection or reliance on remote servers is needed.

In some implementations, the one or more user devices 640, 650 are used in conjunction with only local sensors and/or local devices in a house. In these implementations, the system 600 only includes the one or more user devices 640, 650, the sensors 620, the module 625, the camera 630, and the home assistant 696. The one or more user devices 640, 650 receive data directly from the sensors 620, the module 625, the camera 630, and the home assistant 696 and sends data directly to the sensors 620, the module 625, the camera 630, and the homes assistant 696. The one or more user devices 640, 650 provide the appropriate interfaces/processing to provide visual surveillance and reporting.

In some implementations, the one or more user devices 640, 650 may include a microphone that can be used to capture audio data. The user devices 640, 650 can be configured to transmit the captured audio data to a monitoring system control unit 610, monitoring application server 660, or both. In some implementations, user devices 640, 650 are configured to associate a timestamp with the captured audio data prior to transmitting the captured audio data.

In other implementations, the system 600 further includes network 605 and the sensors 620, the module 625, the camera 630, the thermostat 634, and the homes assistant 696 are configured to communicate sensor and image data to the one or more user devices 640, 650 over network 605 (e.g., the Internet, cellular network, etc.). In yet another implementation, the sensors 620, the module 625, the camera 630, the thermostat 634, or a component, such as a bridge/router are intelligent enough to change the communication pathway from a direct local pathway when the one or more user devices 640, 650 are in close physical proximity to the sensors 620, the module 625, the camera 630, the thermostat 634, and the home assistant 696 to a pathway over network 605 when the one or more user devices 640, 650 are farther from the sensors 620, the module 625, the camera 630, the thermostat 634, and the home assistant 696. In some examples, the system leverages GPS information from the one or more user devices 640, 650 to determine whether the one or more user devices 640, 650 are close enough to the sensors 620, the module 625, the camera 630, the thermostat 634, or the home assistant 696 to use the direct local pathway or whether the one or more user devices 640, 650 are far enough from the sensors 620, the module 625, the camera 630, the thermostat 634, and the home assistant 696 that the pathway over network 605 is required. In other examples, the system leverages status communications (e.g., pinging) between the one or more user devices 640, 650 and the sensors 620, the module 625, the camera 630, the thermostat 634, or the home assistant 696 to determine whether communication using the direct local pathway is possible. If communication using the direct local pathway is possible, the one or more user devices 640, 650 communicate with the sensors 620, the module 625, the camera 630, the thermostat 634, and the home assistant 696 using the direct local pathway. If communication using the direct local pathway is not possible, the one or more user devices 640, 650 communicate with the sensors 620, the module 625, the camera 630, the thermostat 634, and the home assistant 696 using the pathway over network 605.

What is claimed is:

1. A monitoring system comprising one or more computers and one or more storage devices on which are stored instructions that are operable, when executed by the one or more computers, to cause the one or more computers to perform operations comprising:
   receiving, from a sensor that is configured to generate sensor data that reflects an attribute of a property, the sensor data;
   determining whether the sensor data satisfies one or more data criteria;
   in response to determining that the sensor data satisfies the one or more data criteria, activating a microphone that i) is not connected to a pipe, ii) detects audio data associated with the pipe, and iii) is a different sensor than the sensor;

receiving, from the microphone, microphone data including the audio data;

providing the sensor data that reflects the attribute of the property and the microphone data including the audio data as inputs to a model that is trained to determine whether a device connected to the pipe is being used;

receiving, from the model, data identifying, from a plurality of types of devices connected to the pipe, a particular device connected to the pipe that is likely being used; and in response to receiving the data identifying the particular device connected to the pipe that is likely being used, performing a monitoring system action related to the property.

2. The monitoring system of claim 1, the operations comprising:

receiving historical data that includes past sensor data, past audio data, and data indicating a second device connected to the pipe is being used; and training, using the historical data and machine learning, the model to receive given sensor data and given audio data and output data indicating that a given device connected to the pipe is likely being used.

3. The monitoring system of claim 1, the operations comprising:

receiving, from a user, data confirming that the device connected to the pipe is being used; and based on the data confirming that the device connected to the pipe is being used, updating, using machine learning, the model.

4. The monitoring system of claim 1, wherein:

the sensor is a motion sensor;

the sensor data is motion sensor data that reflects motion in a particular room of the property; and the operations comprising:

receiving the sensor data and the audio data by receiving the motion sensor data and the audio data; and providing the sensor data and the audio data as inputs to the model by providing the motion sensor data and the audio data as inputs to the model; and wherein the particular device connected to the pipe and that is likely being used is located in the particular room.

5. The monitoring system of claim 1, wherein:

the pipe is a water pipe, and the particular device connected to the pipe is an appliance that consumes water, or a device that consumes water.

6. The monitoring system of claim 1, wherein:

the sensor is an electrical sensor, the sensor data is electrical sensor data that reflects electrical power consumption at the property, and the operations comprising:

receiving the sensor data and the audio data by receiving the electrical sensor data and the audio data; and providing the sensor data and the audio data as an input to the model by providing the electrical sensor data and the audio data as and input to the model, wherein the particular device connected to the pipe and that is likely being used has an electrical power usage signature that is similar to the electrical power consumption at the property.

7. The monitoring system of claim 1, wherein the microphone data includes data indicating a location of the microphone when the microphone provides the audio data, and the operations comprising:

receiving data indicating a location of the sensor; and providing the data indicating the location of the sensor and the data indicating the location of the microphone when the microphone provides the audio data as inputs to the model.

8. The monitoring system of claim 1, the operations comprising:

receiving, for each previous use of the device that is connected to the pipe and before receiving the sensor data, historical data that comprises:

previous sensor data collected during the previous use of the device that is connected to the pipe;

data indicating a location of the sensor;

previous audio data collected during the previous use of the device that is connected to the pipe;

data indicating a second location of the microphone; and data indicating the previous use of the device that is connected to the pipe; and training, using machine learning, the model using the historical data that comprises the previous sensor data, the data indicating the location of the sensor, the previous audio data, the data indicating the second location of the microphone, and the data indicating the previous use of the device.

9. The monitoring system of claim 1, the operations comprising:

determine an arming status of the monitoring system, wherein the monitoring system action related to the property i) is based on the arming status of the monitoring system and ii) includes one or more of sending a notification to a resident of the property, turning on a light, turning off a light, unlocking a door, locking a door, opening blinds, closing blinds, turning on a camera, turning off a camera, or turning off a water shutoff valve.

10. The monitoring system of claim 1, the operations comprising:

receiving historical data from another property; and training, using the historical data from another property and machine learning, the model to receive given sensor data and given audio data and output data indicating that a given device connected to the pipe is being used.

11. The monitoring system of claim 1, wherein:

the sensor comprises a motion sensor; and the one or more data criteria require detection of motion.

12. A computer-implemented method comprising:

receiving, from a sensor that is configured to generate sensor data that reflects an attribute of a property, sensor data;

determining whether the sensor data satisfies one or more data criteria;

in response to determining that the sensor data satisfies the one or more data criteria, activating a microphone that i) is not connected to a pipe, ii) detects audio data associated with the pipe, and iii) is a different sensor than the sensor;

receiving, from the microphone, microphone data including the audio data;

providing the sensor data that reflects the attribute of the property and the microphone data including the audio data as inputs to a model that is trained to determine whether a device connected to the pipe is being used;

receiving, from the model, data identifying, from a plurality of types of devices connected to the pipe, a particular device connected to the pipe that is likely being used; and
in response to receiving the data identifying the particular device connected to the pipe that is likely being used, performing a monitoring system action related to the property.

13. The method of claim 12, further comprising:
receiving historical data that includes past sensor data, past audio data, and data indicating a second device connected to the pipe is being used; and
training, using the historical data and machine learning, the model to receive given sensor data and given audio data and output data indicating that a given device connected to the pipe is likely being used.

14. The method of claim 12, further comprising:
receiving, from a user, data confirming that the device connected to the pipe is being used; and
based on the data confirming that the device connected to the pipe is being used, updating, using machine learning, the model.

15. The method of claim 12, wherein:
the sensor is a motion sensor;
the sensor data is motion sensor data that reflects motion in a particular room of the property; and
the method further comprising:
receiving the sensor data and the audio data by receiving the motion sensor data and the audio data; and
providing the sensor data and the audio data as inputs to the model by providing the motion sensor data and the audio data as inputs to the model; and
wherein the particular device connected to the pipe and that is likely being used is located in the particular room.

16. The method of claim 12, wherein:
the pipe is a water pipe, and
the particular device connected to the pipe is an appliance that consumes water, or a device that consumes water.

17. The method of claim 12, wherein:
the sensor is an electrical sensor,
the sensor data is electrical sensor data that reflects electrical power consumption at the property, and
the method further comprising:
receiving the sensor data and the audio data by receiving the electrical sensor data and the audio data; and
providing the sensor data and the audio data as an input to the model by providing the electrical sensor data and the audio data as and input to the model,
wherein the particular device connected to the pipe and that is likely being used has an electrical power usage signature that is similar to the electrical power consumption at the property.

18. A non-transitory computer-readable medium storing software comprising instructions executable by one or more computers which, upon such execution, cause the one or more computers to perform operations comprising:
receiving, from a sensor that is configured to generate sensor data that reflects an attribute of a property, sensor data;
determining whether the sensor data satisfies one or more data criteria; in response to determining that the sensor data satisfies the one or more data criteria, activating a microphone that i) is not connected to a pipe, ii) detects audio data associated with the pipe, and iii) is a different sensor than the sensor;
receiving, from the microphone, microphone data including the audio data;
providing the sensor data that reflects the attribute of the property and the microphone data including the audio data as inputs to a model that is trained to determine whether a device connected to the pipe is being used;
receiving, from the model, data identifying, from a plurality of types of devices connected to the pipe, a particular device connected to the pipe that is likely being used; and in response to receiving the data identifying the particular device connected to the pipe that is likely being used, performing a monitoring system action related to the property.

* * * * *

UNITED STATES PATENT AND TRADEMARK OFFICE
CERTIFICATE OF CORRECTION

| | |
|---|---|
| PATENT NO. | : 11,854,367 B1 |
| APPLICATION NO. | : 17/000040 |
| DATED | : December 26, 2023 |
| INVENTOR(S) | : Colin Ulen |

It is certified that error appears in the above-identified patent and that said Letters Patent is hereby corrected as shown below:

In the Claims

In Claim 6, Column 33, Line 59, delete "and" and insert -- an --.

In Claim 17, Column 36, Line 10 (approx.), delete "and" and insert -- an --.

Signed and Sealed this
Thirteenth Day of February, 2024

Katherine Kelly Vidal
*Director of the United States Patent and Trademark Office*